(12) United States Patent
Pilkauskas et al.

(10) Patent No.: US 11,575,656 B1
(45) Date of Patent: Feb. 7, 2023

(54) CUSTOMER DATA HANDLING IN A PROXY INFRASTRUCTURE

(71) Applicant: coretech It, UAB, Vilnius (LT)

(72) Inventors: Valdas Pilkauskas, Vilnius (LT); Miroslav Kozlovski, Vilnius (LT); Gytis Ciuta, Vilnius (LT)

(73) Assignee: coretech It, UAB, Vilnius (LT)

( * ) Notice: Subject to any disclaimer, the term of this patent is extended or adjusted under 35 U.S.C. 154(b) by 0 days.

(21) Appl. No.: 17/669,214

(22) Filed: Feb. 10, 2022

Related U.S. Application Data

(60) Provisional application No. 63/308,350, filed on Feb. 9, 2022.

(51) Int. Cl.
| | |
|---|---|
| *H04L 9/40* | (2022.01) |
| *H04L 41/12* | (2022.01) |
| *H04L 12/66* | (2006.01) |
| *H04L 12/46* | (2006.01) |
| *H04L 61/4511* | (2022.01) |

(52) U.S. Cl.
CPC ...... *H04L 63/0281* (2013.01); *H04L 12/4641* (2013.01); *H04L 12/66* (2013.01); *H04L 41/12* (2013.01); *H04L 61/4511* (2022.05)

(58) Field of Classification Search
CPC ..... H04L 12/4641; H04L 12/66; H04L 41/12; H04L 61/4511; H04L 63/0281
See application file for complete search history.

(56) References Cited

U.S. PATENT DOCUMENTS

| | | | | |
|---|---|---|---|---|
| 10,873,647 | B1 * | 12/2020 | Pilkauskas | H04L 67/288 |
| 10,972,436 | B1 * | 4/2021 | Simanel | H04L 67/145 |
| 11,057,351 | B1 * | 7/2021 | Simanel | H04L 67/146 |
| 11,184,458 | B1 * | 11/2021 | Suckel | H04L 67/1029 |
| 11,196,833 | B1 * | 12/2021 | Norbutas | H04L 63/0272 |
| 11,425,113 | B2 * | 8/2022 | Allen | H04L 63/0823 |
| 2014/0122741 | A1 * | 5/2014 | Thubert | H04L 45/04 709/239 |
| 2016/0156729 | A1 * | 6/2016 | Essigmann | H04L 67/564 709/202 |
| 2017/0085488 | A1 * | 3/2017 | Bhattacharya | H04L 41/122 |
| 2018/0278506 | A1 * | 9/2018 | Bifulco | H04L 47/00 |
| 2022/0070272 | A1 * | 3/2022 | Vasiliauskas | H04L 67/101 |

* cited by examiner

*Primary Examiner* — Khaled M Kassim
*Assistant Examiner* — Kai Chang
(74) *Attorney, Agent, or Firm* — Sterne, Kessler, Goldstein & Fox P.L.L.C.

(57) ABSTRACT

Systems and methods herein provide for a proxy infrastructure. In the proxy infrastructure, a network element (e.g., a supernode) is connected with a plurality of exit nodes. At one of a plurality of messenger units of the proxy infrastructure, a proxy protocol request is received directly from a client computing device. The proxy protocol request specifies a request and a target. In response the proxy protocol request, a selection is made between one between one of the plurality of exit nodes. A message with the request is sent from the messenger to the supernode connected with the selected exit node. Finally, the message is sent from the supernode to the selected exit node to forward the request to the target.

20 Claims, 10 Drawing Sheets

CUSTOMER DATA HANDLING IN A PROXY INFRASTRUCTURE

BACKGROUND

Proxy servers generally act as intermediaries for requests from clients seeking content, services, and/or resources from target servers (e.g., web servers) on the internet. For example, a client may connect to a proxy server to request data from another server. The proxy server evaluates the request and forwards the request to the other server containing the requested data. In the forwarded message, the source address may appear to the target to be not the client, but the proxy server. After obtaining the data, the proxy server forwards the data to the client. Depending on the type of request, the proxy server may have full visibility into the actual content fetched by the client, as is the case with an unencrypted Hypertext Transfer Protocol (HTTP) session. In other instances, the proxy server may blindly forward the data without being aware of what is being forwarded, as is the case with an encrypted Hypertext Transfer Protocol Secure (HTTPS) session.

To interact with a proxy server, the client may transmit data to the proxy server formatted according to a proxy protocol. The HTTP proxy protocol is one example of how the proxy protocol may operate. HTTP operates at the application layer of the network stack (layer 7). In another example, HTTP tunneling may be used, using, for example, the HTTP CONNECT command. In still another example, the proxy may use a SOCKS Internet protocol. While the HTTP proxy protocol operates at the application layer of the OSI (Open Systems Interconnection) model protocol stack, SOCKS may operate at the session layer (layer 5 of the OSI model protocol stack). Other protocols may be available forwarding data at different layers of the network protocol stack.

Proxy servers, however, do more than simply forward web requests. In some instances, proxy servers can act as a firewall, act as a web filter, provide shared network connections, and cache data to speed up common requests. Proxy servers can also provide privacy and can control internet usage of employees and children. Proxies can also be used to bypass certain internet restrictions (e.g., firewalls) and to circumvent geo-based content restrictions. For example, if a client requests content from a webpage located on a webserver in one country, but the client's home country does not allow access to that content, the client can make the request through a proxy server that contacts and retrieves the content, thereby concealing the location of the target server. Proxy servers can also be used for web scraping, data mining, and other similar tasks. A proxy server changes the request's source IP address, so the web server is not provided with the geographical location of the scraper. Using the proxy server makes a request appear more organic and thus ensures that the results from web scraping represents what would actually be presented were a human to make the request from that geographical location.

Proxy servers fall into various types depending on the IP (Internet Protocol) address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. Blocks of residential IP addresses may be bought from the owning proxy service provider by another company directly in bulk. Mobile IP proxies are a subset of the residential proxy category. A mobile IP proxy is one with an IP address that is obtained from mobile operators. A datacenter IP proxy is the proxy server assigned with a datacenter IP. Datacenter IPs are IPs owned by companies, not by individuals.

Many service providers across the Internet provide services to consumers, and hence are configured to block, or require additional verification (such as CAPTCHAS), when they receive requests originated from data centers. Residential and mobile IP proxies may be advantageous over data center proxies because, to the target website, requests from these proxies appear to originate from consumers.

Exit node proxies, or simply exit nodes, are gateways where the traffic hits the Internet. There can be several proxies used to perform a user's request, but the exit node proxy is the final proxy that contacts the target and forwards the information from the target to a user device, perhaps via a previous proxy. There can be several proxies serving the user's request, forming a proxy chain, passing the request through each proxy, with the exit node being the last link in the chain that ultimately passes the request to the target.

SUMMARY

Systems and methods herein provide a proxy infrastructure. In an embodiment, a proxy infrastructure is operated. In the third embodiment, a network element (e.g., a supernode) is connected to a plurality of exit nodes. At one of a plurality of messenger units of the proxy infrastructure, a proxy protocol request is received directly from a client computing device. The proxy protocol request specifies a request and a target. In response to the proxy protocol request, a selection is made between one of the plurality of exit nodes. A message with the request is sent from the messenger to the supernode connected to the selected exit node. Finally, the message is sent from the supernode to the selected exit node to forward the request to the target.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE FIGURES

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Figure 1A:
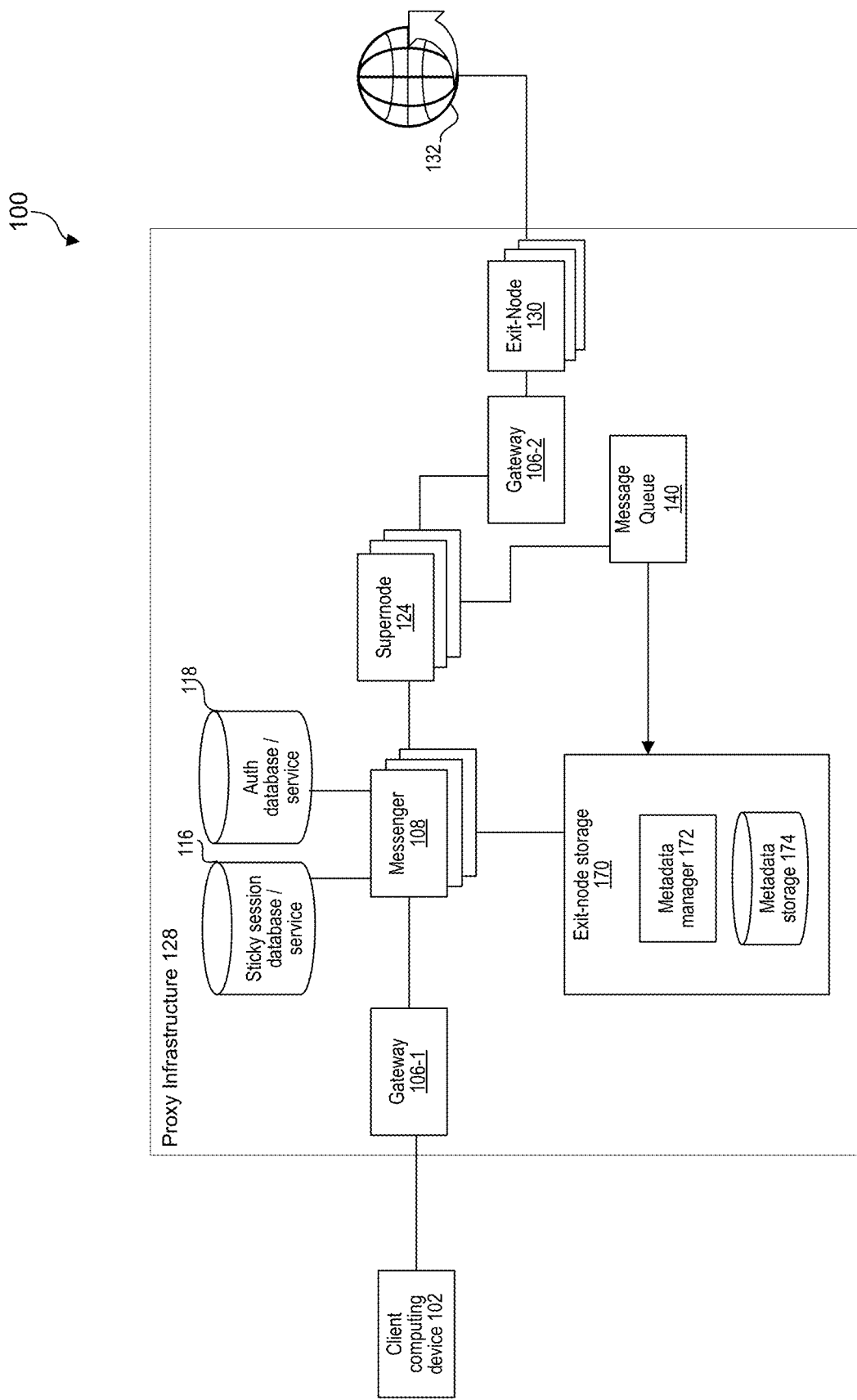
FIG. 1A is a system diagram that illustrates a proxy infrastructure according to an embodiment.

FIG. 1A is a block diagram of a system 100 for providing an internet proxy, in one exemplary embodiment. System 100 includes a client computing device 102, proxy infrastructure 128, and a target 132. The embodiments herein are operable to provide an internet proxy to a client device 102 such that the device 102 can retrieve data from, or otherwise exchange data with, another location on the internet (e.g., web servers, devices, etc.). While illustrated with one of these components, there are typically thousands, if not millions, of client devices 102 attempting internet proxies to other devices and web servers (collectively referred to herein as targets 132) at any given time. And, the number of targets 132 accessed by the system 100 may also number in the millions. Examples of the targets 132 include Web servers, endpoint devices used in the Internet of Things (IoT), other client devices 102 (e.g., smart phones, computers, etc.), and the like.

Proxy infrastructure 128 is split into smaller chunks (e.g., services) so that exit nodes 130 are not lost during deployments or outages. Each of these components and their subcomponents described below.

Client computing device 102 is a computing device that initiates a request to a target 132 through a proxy. As described above, client computing device 102 may choose to send the request through proxy to conceal the source of the request. In one embodiment, client computing device 102 may be from a customer that is a different entity than the entity that controls and manages proxy infrastructure 128. In another embodiment, client computing device 102 may be controlled by the same entity that manages proxy infrastructure 128. For example, client computing device 102 may be a web scraping system that formats and generates web requests, as specified by a customer.

To initiate the request, client computing device 102 may send a request to a proxy infrastructure 128, and in particular a gateway 106-1 of proxy infrastructure 128, using a proxy protocol. Various proxy protocols may be available. Examples of a proxy protocol include the HTTP proxy protocol and a SOCKS protocol. In another example, HTTP tunneling may be used, using, for example, the HTTP CONNECT command. While the HTTP proxy protocol operates at the application layer of the OSI model protocol stack, SOCKS may operate at the session layer (layer 5 of the OSI model protocol stack). In still another example, a transparent proxy may be used. A transparent proxy, also known as an inline proxy, intercepting proxy, or forced proxy, is a server that intercepts the connection between an end-user or device and the internet. A firewall may intercept the request from client computing device 102 and send it to proxy infrastructure 128.

The proxy protocol message sent from client computing device 102 to proxy infrastructure 128 can have various components. The message can include a destination address (e.g., destination IP address) of target 132. The message can include authentication parameters that identify a customer associated with client computing device 102 to proxy infrastructure 128. The message can also include other data needed to request information from target 132. For example, in the case where the message is an HTTP proxy request, the message could include a target path and parameters. Finally, the message can have embedded within it other parameters that signal proxy infrastructure 128 and affect its behavior. For example, the message can have a parameter that indicates a desired location for the proxy to access target 132 or a session ID indicating a session to use when accessing target 132.

In one example, the proxy protocol message may be an HTTP CONNECT message as set out below. The HTTP CONNECT message asks a proxy server to establish a TCP connection to the target. Once the TCP connection has been established by the server, the proxy server continues to proxy the TCP stream to and from the client. As will be discussed in greater detail below with respect to FIGS. 4A-B, HTTP CONNECT may initiate a TLS (Transport Layer Security) handshake to support an HTTPS connection between client computing device 102 and target 132:

CONNECT example.io HTTP/1.1
Host: example.io
Proxy-Authorization: Basic customer-<Username>-sessionid-123-cc-LT-city-Vilnius:<Password>
Proxy-Connection: Keep-Alive As mentioned above, this example HTTP CONNECT message may be addressed to gateway 106-1 of proxy infrastructure 128 from client computing device 102. The message may instruct proxy infrastructure 128 to forward the CONNECT message to target 132, which, in this example, it is addressed at the hostname "example.io." The message indicates the protocol used (e.g., "HTTP/1.1") and has a Proxy-Connection header that is set to "Keep-Alive." The "Keep-Alive" Proxy-Connection header may indicate to proxy infrastructure 128 to provide multiple HTTP requests and responses within a single TCP session.

Embedded in the example proxy authorization header are a username and password. The Proxy-Authorization field has a username and password separated by a colon. While the username and password are illustrated in plain text here for simplicity, a skilled artisan will recognize that they may be encoded in Base64 or other encoding technique. Embedded in the username are session information (in this example, "sessionid-123") and a desired location for the proxy (in this example, Vilnius, Lithuania). Also embedded in the username of the Proxy-Authorization field is a <Username> field identifying the customer associated with client computing device 102. Finally, in the password portion of the Proxy-Authorization credentials, a password associated with the customer may be provided.

As mentioned above, client computing device 102 may connect to proxy infrastructure 128 through gateway 106-1. The proxy protocol message from client computing device 102 may be addressed to gateway 106-1. The IP address of gateway 106-1 may be resolved using standard Domain Name System techniques. In one example, the proxy protocol message may be routed to one of several server computers for gateway 106-1 using Anycast. In Anycast, a collection of servers share the same IP address and send data from a source computer to the server that is topographically the closest. In this way, either by routing using Anycast, the proxy protocol message from client computing device 102 may be routed to a server for gateway 106-1 that is available and topographically or geologically more convenient.

In various embodiments, gateway 106-1 can have different functions. First, gateway 106-1 acts as an entry point for proxy infrastructure 128. It serves to conceal internal components of proxy infrastructure 128 to external customers. On receiving a proxy protocol message, gateway 106-1 may forward data from the proxy protocol message to messenger 108. To send data to messenger 108, gateway 106-1 may use the same proxy protocol format that it received data in. Alternatively, gateway 106-1 may translate the data to a format used by proxy infrastructure 128 internally to exchange data. To communicate with each other, gateway 106-1 and messenger 108 (as well as other internal components of proxy infrastructure 128) may use any of various well-known messaging formats, including, but not limited to, TCP, UDP, HTTP(S), HTTP3, QUICK and Web Socket.

Second, gateway 106-1 can enrich an incoming request to add to the message sent to messenger 108 data that proxy infrastructure 128 uses in processing the proxy request. In one example where the message sent from gateway 106-1 to messenger 108 is an HTTP message, HTTP headers may be added to the message sent to messenger 108. For example, some clients may request proxy infrastructure 128 make a request to the target 132 from a source IP address that has been whitelisted. The whitelisted IP addresses may be, for example, IP addresses from a particular city or country. As described above, in one embodiment, a client can select a geographic location for the source IP address using the username and credentials that are passed as part of the proxy protocol request. Alternatively or additionally, a client can select a geographic location for the source IP address by sending the proxy protocol request to a particular destination address or port associated with gateway 106-1.

For example, gateway 106-1 may be addressable using several different subdomains. An IP address of gateway 106-1 may be selected using the DNS lookup process. For example, suppose proxy infrastructure 128 is associated with the top level domain ".com" and second level domain "proxy." In that example, gateway 106-1 may be addressable by various different subdomains such as "us.proxy.com", "ca.proxy.com", or "lt.proxy.com." Each subdomain may be associated with an IP address and, when gateway 106-1 receives a request directed to that IP address, gateway 106-1 enriches the message it sends to messenger 108 to indicate that a particular set a whitelisted IPs are selected.

Similarly, gateway 106-1 may be listening for a proxy protocol requests on a number of different ports, such as TCP ports. When a client computing device 102 sends a request to gateway 106-1, it may select which port to use based on what source IP addresses it wants proxy infrastructure 120 to use. When gateway 106-1 receives a request on a particular port, gateway 106-1 may enrich the message it sends to messenger 108 to indicate that a particular set a whitelisted IPs are selected.

Third and finally, gateway 106-1 may act as a load balancer to distribute incoming data between one of several servers running messenger 108. For example, gateway 106-1 can select a server running messenger 108 that is geographically or topographically convenient. Alternatively or additionally, gateway 106-1 can use round-robin or other known load-balancing algorithm to distribute requests among a plurality of servers to make overall processing more efficient and optimize usage of computing resources and corresponding response time. For example, gateway 106-1 may track the load on respective servers running messenger 108 and select a server that is less busy over one that is busier.

In an embodiment, gateway 106-1 may be unnecessary and instead, client computing device 102 can communicate directly with messenger 108. This is illustrated in system 150 in FIG. 1B.

As mentioned above, proxy infrastructure 128 may include multiple messengers 108. When client computing device 102 sends a message to proxy infrastructure 128 may address the message to a DNS address, such as "us.proxy.com." Before sending the message to proxy infrastructure 128, client computing device 102 resolves the DNS address into an IP address. Client computing device 102 resolves the DNS address into an IP address by accessing a DNS server 151. The Domain Name System (DNS) is the hierarchical and decentralized naming system used to identify computers, services, and other resources reachable through the internet or other internet protocol networks. The resource records contained in the DNS associate domain names with IP addresses. DNS server 151 may select between one of several messengers 108 available for a DNS address, such as "us.proxy.com," returning one of several possible IP addresses. Client computing device 102 will send the message to the selected IP address. In this way, using the DNS system, DNS server 151 provides load-balancing amongst various messengers 108 as described above.

In addition, when gateway 106-1 is absent, messenger 108 can provide other functions of gateway 106-1 described above. For example, messenger 108 can convert a proxy protocol message into an internal format. Also, messenger 108 can enrich the message as described above.

Regardless of whether messenger 108 receives the request directly from client computing device 102 or through gateway 106-1, messenger 108 may check authorization credentials and select an exit node from which to send a request to target 132. To check authorization credentials, messenger 108 may compare credentials (such as a username and password) received with the proxy request with credentials stored in authorization database 118.

Authentication database 118 may retain information pertaining to the authentication of the client. Thus, when messenger 108 receives the request from the client device 102, messenger 108 may retrieve the client's authentication credentials from database 118 to compare them to the credentials in the request and thus authenticate the client into proxy infrastructure 128. Database 118 may also maintain information pertaining to customer providing the authentication parameters (e.g., client identification, billing information, traffic limits, applied bandwidth limitations, subscription information, status, client passwords, etc.).

In some embodiments, the messenger 108 monitors bandwidth limits of clients. Database 118 may retain information pertaining to target blacklists and whitelists (i.e., targets that the client device 102 cannot access and can access, respectively). In some embodiments, proxy infrastructure 128 consumes customer traffic information for respected clients and updates current usage for specific clients in the database 118. When usage exceeds limits for the client, messenger 108 may deny service. In further embodiments, messenger 108 may interact with database 118 to determine whether targets are blocked for the client device 102 or determine whether certain features are enabled for client device 102 (e.g., Quality of Service, or "QoS").

To select an exit node, messenger 108 may coordinate with sticky session database 116 and exit node storage 170. Messenger 108 may access sticky section database 116 to determine whether there is an exit node that has already been selected for a session that the client seeks to send the proxy request for. A session is a temporary and interactive information interchange between two or more communicating devices. Examples include an HTTP session and a TCP session. Often, a target server will expect multiple requests for a session to come from the same source. Thus, sticky session database 116 remembers an exit node that has been previously used for a particular session. As mentioned above, client computing device 102 can indicate a session that the proxy request belongs to using a session ID in the credentials field of the proxy request. Messenger 108 extracts the session ID and looks up the session ID in sticky session database 116. If sticky session database 116 indicates that an active session exists for the session ID, messenger 108 will extract from session database 116 an identification of an exit node that was previously used to access target 132 for the session. Messenger 108 will select that exit node accordingly. In this way, when proxy infrastructure 128 receives multiple proxy requests belong to the same session, proxy infrastructure 128 can use the same exit node for each of them, making the session appear more organic to target 132.

If a client has not defined a session or sticky session database 116 does not have an exit node already assigned for a particular session ID, messenger 108 will coordinate with exit node storage 170 to identify an exit node to use. Exit node storage 170 stores information about each exit node managed by proxy infrastructure 128 in metadata storage 174. The exit node metadata stored in metadata storage 174 could include, for example, the exit node's geographic or topological location, which of several supernode 124 components within proxy infrastructure 128 the exit node is connected to, and the exit node's IP address. Exit node storage 170 can organize exit nodes into pools based on geographic location (country-city) and quality.

Using the information stored in metadata storage 174, messenger 108 requests from exit node storage 170 the best suiting exit node available to service the proxy request from client computing device 102. To make the request, messenger 108 will send a message to exit node storage 170 with the options elected by the client relating to the desired exit node (such as desired geographic location). In response, a metadata manager 172 of exit node storage 170 will select an appropriate exit node and respond to messenger 108 with the selected exit node's metadata. The metadata may include an Internet protocol (IP) address of the exit node 130 to route the client request to and a supernode 124 that manages the selected exit node.

When messenger 108 receives an indication of the selected exit node from exit node storage 170, messenger 108 may store the exit node to be used and a session ID indicated by the user, associated with one another, in sticky session database 116. In this way, messenger 108 can select to use the same exit node for subsequent requests in the same session.

As mentioned above, the exit node metadata received at messenger 108 from exit node storage 170 includes an identification of a supernode associated with the exit node. Each exit node may have a corresponding supernode 124.

Generally, the supernode 124 is a computer component (e.g., a server) that operates as a proxy server on the Internet and serves as an intermediary to accept requests from the target device 102 via messenger and forward the requests to other proxy servers and exit nodes 130. Supernode 124 receives proxy request information from messenger 108, and using specific exit node identification, forwards the request to the specified exit node 130 via an already established connection. Then, the specified exit node 130 makes a request, sends respective request data to target 132, which may be specified by client computing device 102, and returns a response back to supernode 124. Supernode 124 will send response back to messenger 108.

In some embodiments, supernode 124 conveys connection information to message queue 140 such that other modules within the system 100 can quickly and efficiently determine statuses of exit nodes 130. For example, the supernode 124, in making connections between the client device 102 and the exit node 130, may monitor the health (e.g., latency and bandwidth) and status of the connections to determine whether an exit node 130 is still functioning, is off-line, and/or is a new exit node 130. This information may be fed to the message queue 140 such that the other modules within the system 100 are aware of the statuses of the exit nodes 130.

When a supernode corresponds to an exit node, the supernode manages connections to the exit node. To manage connection to an exit node, the supernode may periodically conduct health checks. For example, the supernode may ping the exit node, measuring response time. The supernode may log response times of the exit node. This exit node availability information is set, perhaps via message queue 140 to exit node storage 170, which uses the information to select exit nodes to use.

Similar to gateway 106-1, gateway 106-2 acts as an intermediary to conceal other components of proxy infrastructure 128 to exit node 130. As with gateway 106-1, gateway 106-2 may provide load-balancing functionality. When exit node 130 initiates a TCP connection to gateway 106-2, gateway 106-2 can select from several possible supernodes 124 one that is healthy and available. The load-balancing techniques can be similar as to what is described above with respect to gateway 106-1. How exit node 130 connects with a supernode 124 is described in greater detail with respect to FIG. 5.

Exit node 130 is generally a final proxy server that contacts the target 132. The exit node 130 forwards internet traffic from the target 132 to the supernode. Generally, multiple proxy servers may serve requests from the client device 102, forming a "proxy chain", with the exit node 130 being the last link in the chain that ultimately passes the request to the target 132.

The supernode 124 is generally operable to register and use the exit nodes 130. Supernode 124 acts as a router which forwards information to and from exit nodes 130. As will be described in greater detail below with respect to FIG. 4A, the TCP handshake may involve a series of TCP SYN and ACK messages being exchanged piece of the TCP connection.

As mentioned above, supernode 124 gathers data on the exit nodes 130 that it is connected to and returns that information to exit node storage 170. In an embodiment, supernode 124 can be send health information to exit node storage 170 through message queue 140. In some embodiments, message queue 140 is a distributed event streaming platform that is used for data pipelines, streaming analytics, data integration, and mission-critical applications. Event streaming captures data in real-time as streamed events from event sources like databases, sensors, mobile devices, cloud services, and software applications. Message queue 140 stores the event streams durably for later retrieval. Message queue 140 may also manipulate, process, and react to the event streams in real-time and route the event streams to different destinations as needed to ensure a continuous flow and interpretation of data.

In some embodiments, exit-node storage 170 is operable to measure performance and attribute history of the exit node 130 to heuristically predict future performance and reliability. The embodiments herein help ensure that the same exit nodes 130 can be reserved for a client over time and maximize the efficiency through the use of an exit node pool. For example, the present embodiments may analyze the history of the exit nodes 130 to organize them into pools and then predict their performance and behavior as a group so as to assign the potentially best fitting exit nodes 130 for a client. The heuristic prediction can also identify risks associated with connection reliability so that they may be addressed before being assigned to a client. In this way, exit node storage 170 can provide information on the best fitting exit nodes to messenger 108. Various ways on how supernode 124 can report information for consumption by messenger 108 is described below with respect to FIGS. 8-10.

Managed Exit Nodes and Third Party Proxies

Figure 2:
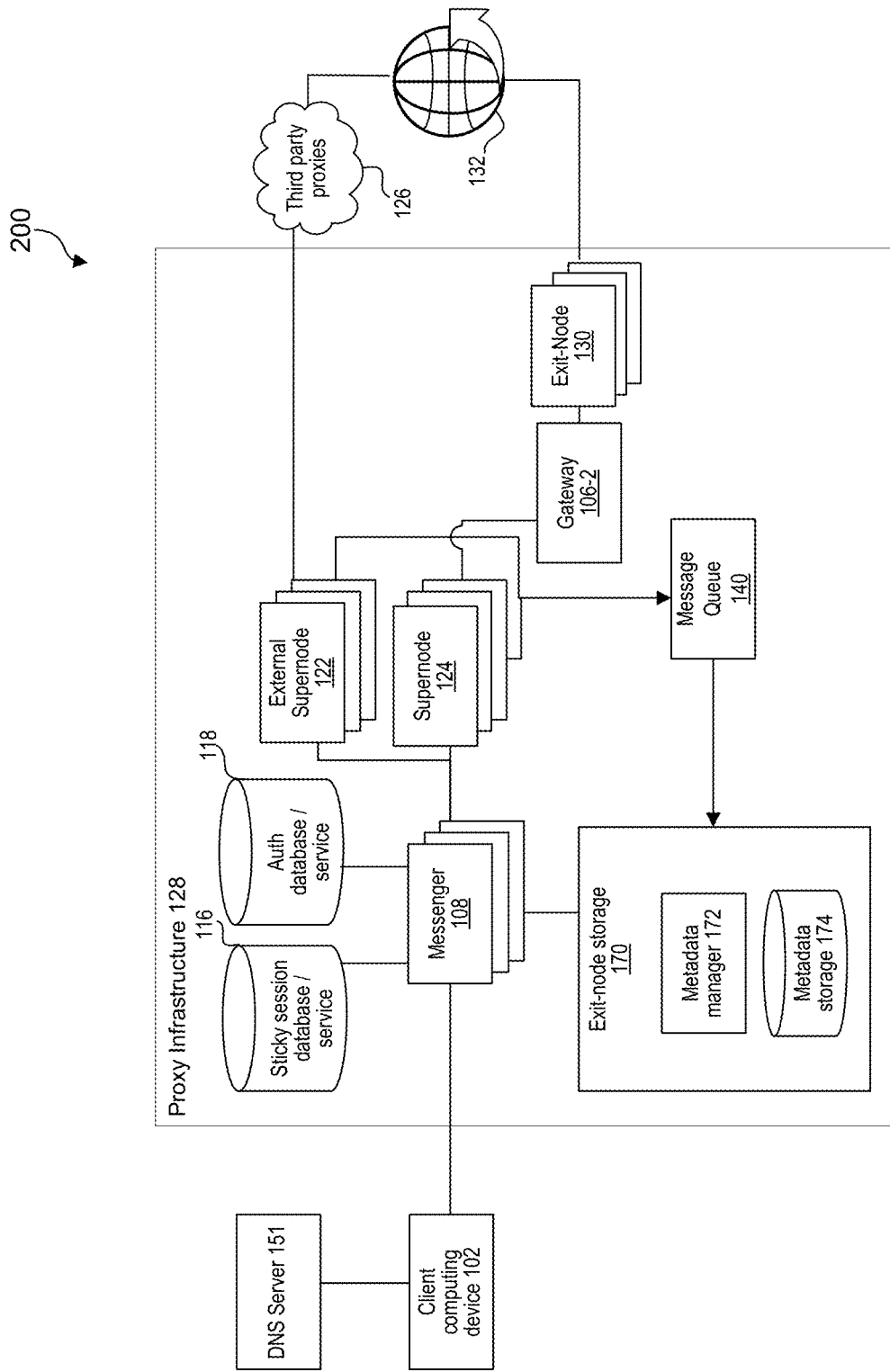
FIG. 2 is a system diagram that illustrates a proxy infrastructure providing access both to exit nodes managed by the proxy infrastructure and to third-party proxies, according to an embodiment.

FIG. 2 illustrates a system 200 that allows proxy infrastructure 128 to access the target through third party proxies 126, in addition to its own exit nodes 130.

As shown in FIG. 2, there may be two types of supernodes—supernode 124 and an external supernode 122. Supernode 124 corresponds to an exit node 130 that is part of proxy infrastructure 128, whereas external supernode 122 corresponds to a third-party proxy that may be serve as an exit node yet be external to proxy infrastructure. There may be many supernodes 124 and many external supernodes 122. Each supernode 124 be connected to many exit nodes, and each external supernode 122 may be connected to many third party proxies.

For example, in some embodiments, the system 100 may not have an established presence with servers located in a particular geographic region. However, other third-party proxy systems may have established servers in those regions. If exit node storage 170 determines that the client is trying to proximate traffic through those regions, the messenger 108 may contact the external supernode 122 instead of supernode 124 to contact the target 132 from a third-party proxy. In this regard, messenger 108 may contact the external supernode 122 such that the third-party proxy 126 may contact the target 132.

Alternatively or additionally, the messenger 108 may direct the external supernode 122 to connect to the third-party proxy 126 during periods of server outages (e.g., outages of the supernodes 124 and/or exit nodes 130) within the system 100 as an internet proxy backup. This "geographic load balancing" may improve performance and availability by steering traffic away from underperforming proxy gateways 106 and/or exit nodes 130 and dynamically distributing the traffic to the more responsive proxy gateways 106 and/or exit nodes 130.

When an external supernode 122 is selected, external supernode 122 sends the message formatted according to a proxy protocol (e.g., HTTP(s) proxy, SOCKS4/5, or transparent proxy) to third party proxy 126. The proxy protocol request from external supernode 122 may be formatted similar to the example proxy protocol request sent from client computing device 102 to gateway 106-1, except perhaps with different proxy authorization parameters according to what is required of the third party proxy 126.

In response to the proxy request from supernode 122, third party proxy 126 sends the corresponding request with his own source IP address to target 132. In the example above where an HTTP CONNECT message is sent from client computing device 102, third-party proxy 126 may begin a TCP handshake. As will be described in greater detail below with respect to FIG. 4A, the TCP handshake may involve a series of TCP SYN and ACK messages being exchanged to establish the TCP communication session. Once the TCP connection is established, third-party proxy 126 may return to external supernode 122 an HTTP OK message, e.g. "HTTP/1.1 200 OK."

External supernode 122 conducts health checks on third-party proxies 126 in the same way that supernode 124 conducts health checks on exit nodes 130. External supernode 122 reports the health statistics (e.g., bandwidth, latency, and availability) to exit node storage 170. Metadata manager 172 then uses that information to select a third-party proxy to use to service a client proxy protocol request.

Figure 3:
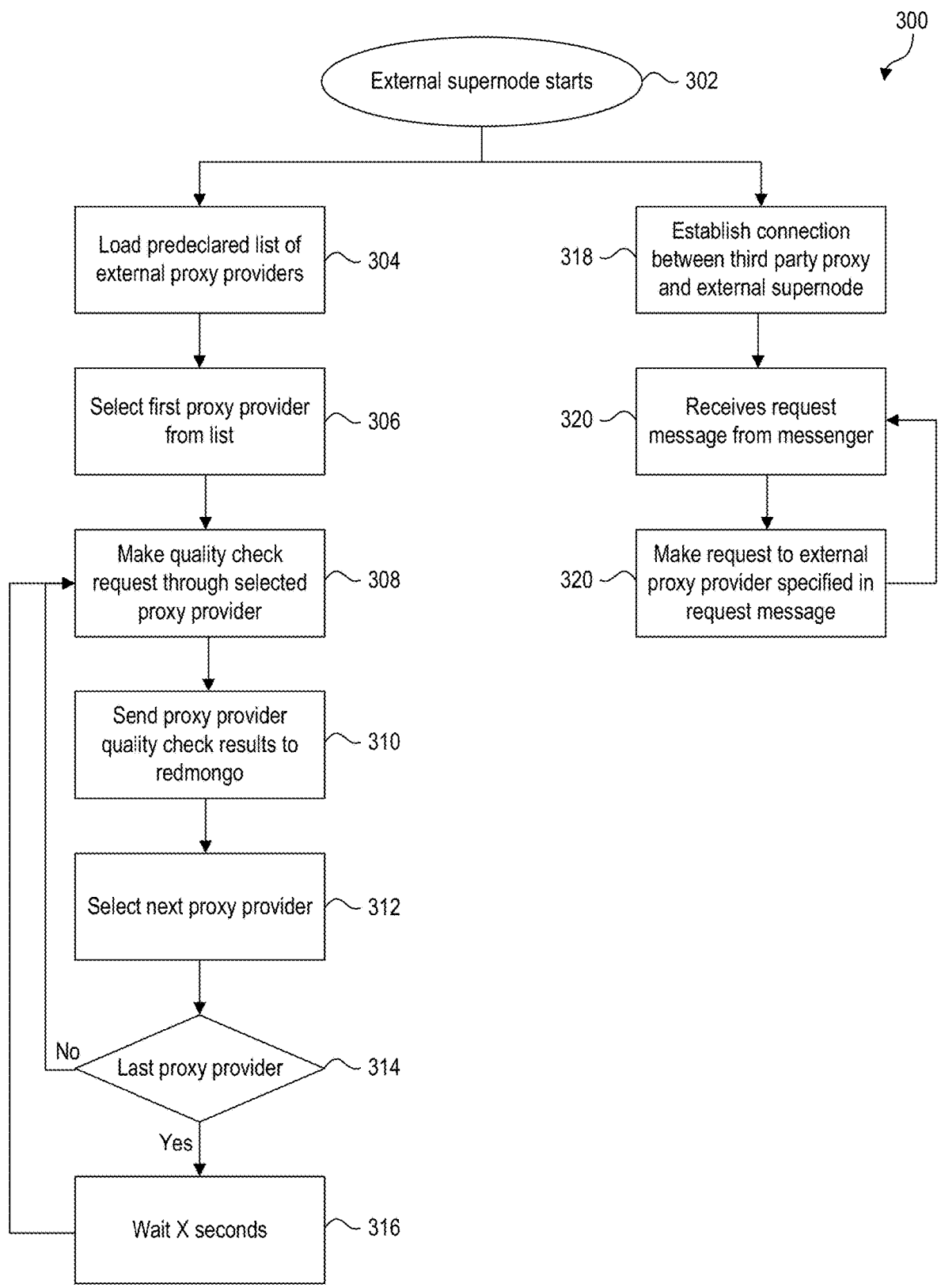
FIG. 3 is a method diagram that illustrates a method for operating an external supernode, according to an embodiment.

FIG. 3 is a flowchart of an exemplary process 300 of an external supernode 122 identifying a proxy provider and its lifecycle of services. For example, if the system that a client computing device 102 would be better served by a third-party proxy, the messenger 108 may contact an external supernode 122 to contact a target 132 via a third-party proxy. This embodiment illustrates one exemplary process 300 of how the external supernode 122 may implement such a connection.

The process 300 generally starts when the external supernode 122 comes online and the system 100 communicates with the external supernode 122, in the step 302. The external supernode 122 may load a pre-declared list of external third-party proxy providers, in the step 304. The external supernode 122 may then select a first third-party proxy provider from the list, in the step 306, and issue a quality check request to the proxy provider, in the step 308. This may be used to determine whether a third-party proxy provider is deemed suitable for further usage. For example, the external supernode 124 may ping a third party proxy provider to evaluate response times of the third party proxy provider. The external supernode 122 may then send the third-party proxy provider quality check results to the data storage module 170, which may maintain the statistics and statuses of the supernodes 122/124, including those of external proxy providers, in the step 310.

Then, in the step 312, the external supernode 122 selects the next proxy provider in the pre-declared list to perform a quality check on. For example, if the next proxy provider in the pre-declared list is not the last proxy provider in the list, in the step 314, then the external supernode 122 performs the next quality check request, in the step 308. If, however, the next proxy provider in the pre-declared list is the last proxy provider in the pre-declared list, then the external supernode 122 waits for some predetermined period of time before performing the quality check request through the proxy provider, in the step 308.

Afterwards, the messenger establishes a connection with the external supernode, in the step 318. Once the connection is established, the messenger 108 can send request messages from a customer/client computing device 102 to the external supernode 122 to use third party proxies for further requests execution. In this regard, the messenger 108 may select the most suitable third party proxy provider from the data storage module 170 and direct the external supernode 124 to connect with that third party proxy provider, in the step 320. The messenger 108 may then issue a connection request to that third party proxy provider through the external supernode 124, which in turn issues the request to the third party proxy provider, in the step 322. With the connection to the external supernode 124 made, the messenger 108 can then continue to send requests from the client computing device 102 to the third party proxy provider through the external supernode 124.

Early OK Message

Figure 4A:
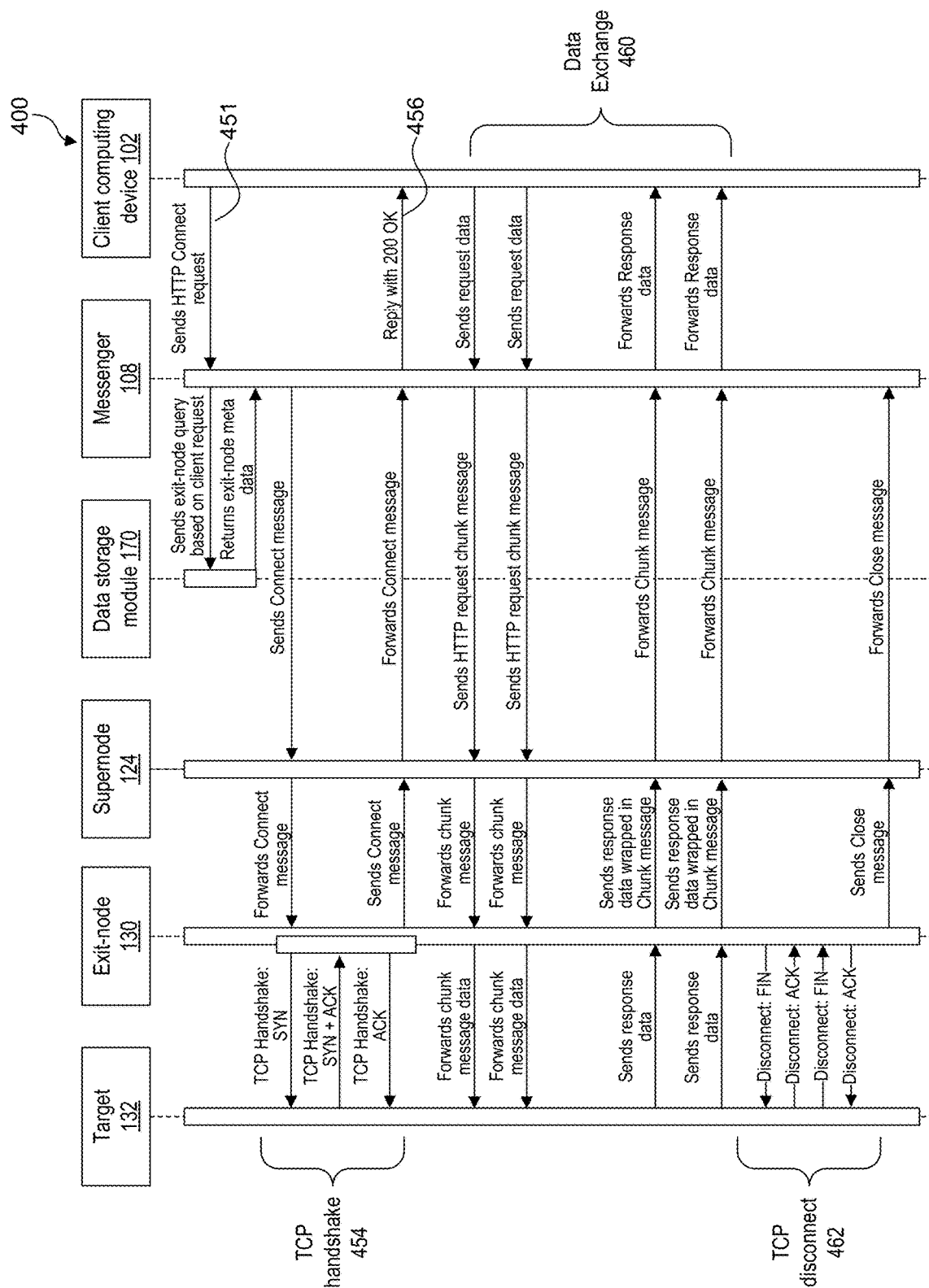
FIG. 4A illustrates an example message flow between components of the proxy infrastructure to service an example HTTP (or HTTPS) request, according to an embodiment.
Figure 4B:
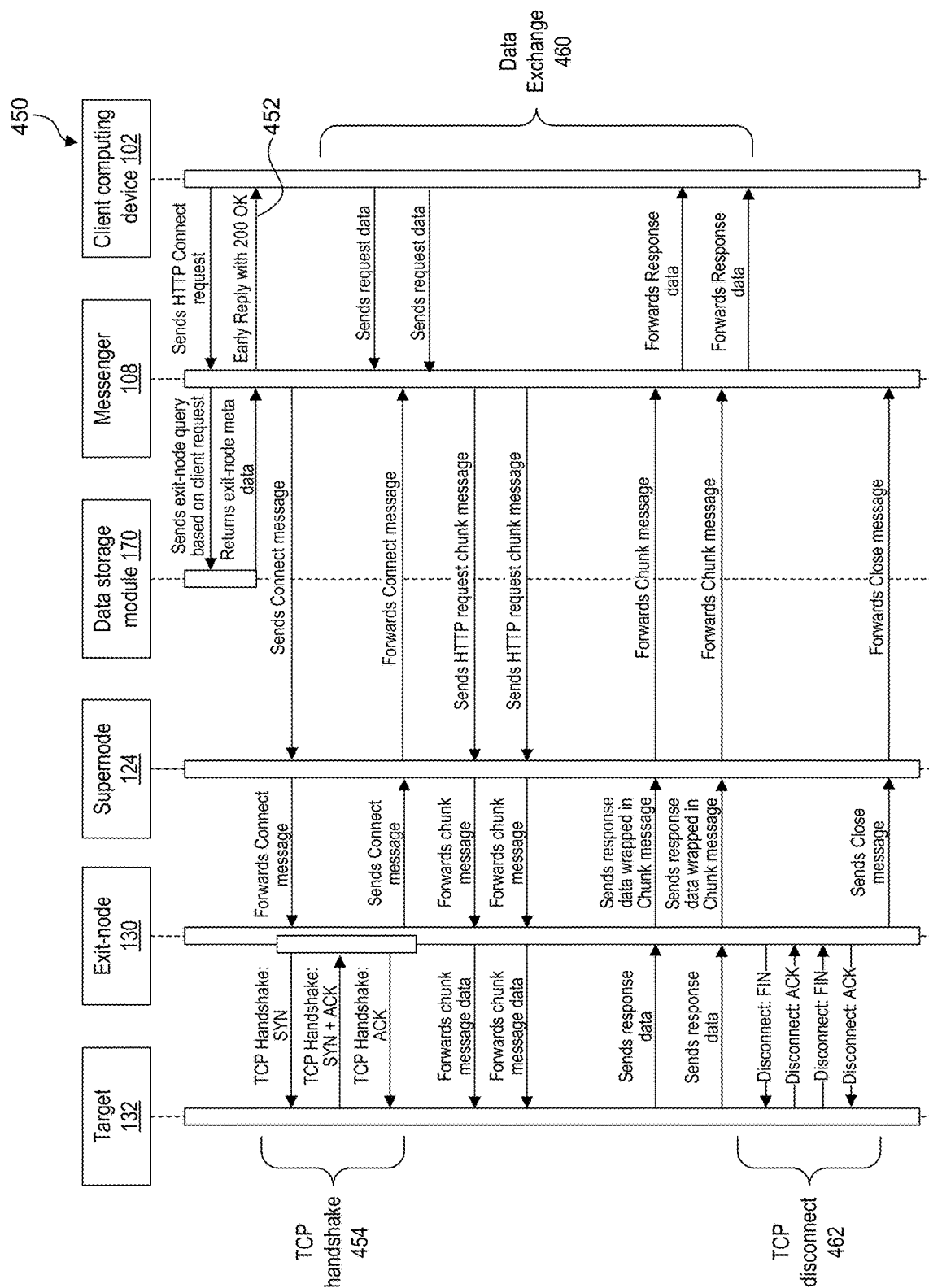
FIG. 4B illustrates an example message flow between components of the proxy infrastructure to provide an early positive connection response, according to an embodiment.

FIG. 4A illustrates an exemplary message diagram 400 in which a client computing device 102 attempts to connect with a target 132. Message diagram 400 is described with respect to components of FIGS. 1A-B and 2. For simplicity, gateways 106-1 and gateways 106-2 are omitted.

Client computing device 102 initiates the connection by sending an HTTP connection request to the messenger 108. In diagram 400, this is illustrated as HTTP connect message 451. An example HTTP connect message is described above with respect to FIG. 1A.

As described above, messenger 108 sends an exit node query based on the client request to the data storage module 170 which in turn, returns exit node metadata to the messenger 108. Messenger 108 then sends a connect message to the supernode 124 which is forwarded to the exit node 130. Alternatively, as described above with respect to FIG. 1B, an external supernode 122 could forward the connect message to a third-party proxy 126.

Exit node 130 (or, in the embodiment described respect to FIG. 1B, third-party proxy 126) then performs a TCP handshake 454 with the target 132 to establish the communication session. TCP handshake 454 may involve exit node 130 sending a SYN message to target 132. Target 132 acknowledges the SYN message by returning an ACK message and sends its own SYN message. Finally, exit node 130 replies to the SYN message from target 132 with its own ACK message.

Once the communication session is established, the exit node 130 sends a message indicating that the connection is established to supernode 124. In the embodiment described above with respect to FIG. 1B, a third-party proxy 126 sends a 200 OK message to external supernode 122. In response, supernode 124 or external supernode 122 sends a message indicating that the connection is established to the messenger 108, which in turn replies to the client computing device 102 with a 200 OK message 456. In this way, only after the TCP session between the target 132 and exit node 130 (or third-party proxy 126) is established and after an indication that the connection has been established has been forwarded to messenger 108 is 200 OK message 456 forwarded to client computing device 102.

After the 200 OK message, data exchange 460 between client computing device 102 and target 132 can take place. In an example, data exchange 460 may involve a TLS handshake to establish secure, encrypted communication between target 132 and client computing device 102. To complete data exchange 460, client computing device 102 may send request data to the target 132 through the connection which is forwarded as chunk messages to the target 132. The target 132 responds with chunk messages of the requested data to the client computing device 102 until the connection is no longer required. In this regard, the exit node 130 may initiate a disconnect with the target 132 and ultimately send a close message to the messenger 108 that closes the connection.

In one embodiment, instead of the messenger 108 sending the 200 OK customer 102 after a communication session is established with the target, the messenger 108 sends an early reply of the 200 OK immediately after receipt of the connect message. This embodiment is illustrated with respect to diagram 450 in FIG. 4B.

As illustrated in diagram 450, messenger 108 automatically sends an early 200 OK reply 452 to the customer 102 while the messenger 108 is still establishing the connection to the target 132. The early 200 OK reply 452 may be sent simultaneously with selection of the exit node. Thus, the customer 102 can begin requesting data from the target 132 while the connection between exit node and the target 132 is being established. The messenger 108 may buffer these data requests until the connection to the target 132 is established. This process may expedite the data being returned to the customer 102 because the messenger 108 may send the buffered requests as a single bundle.

Graceful Supernode Shutdown

Figure 5:
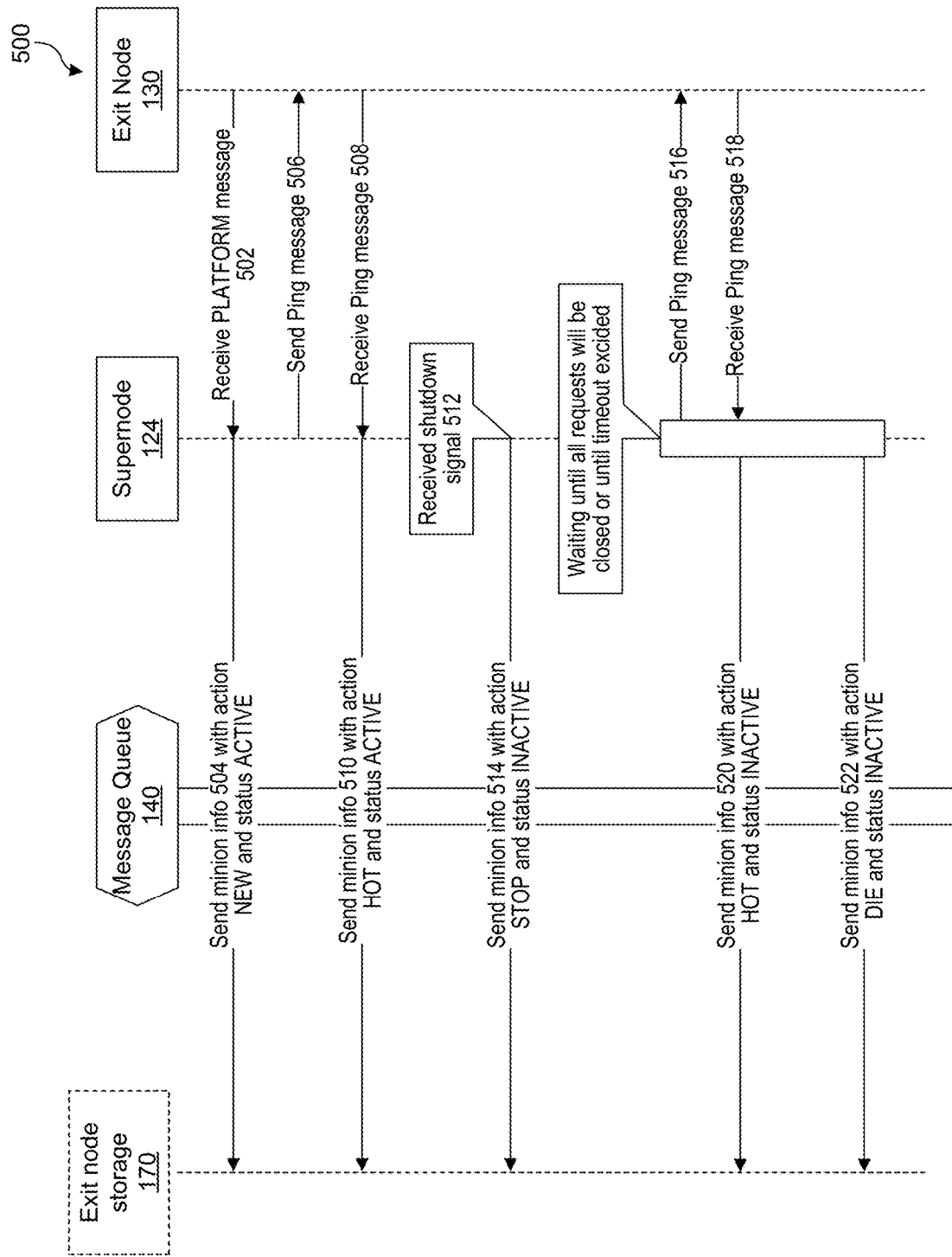
FIG. 5 illustrates an example message flow to gracefully shutdown a supernode, according to an embodiment.

FIG. 5 is a message diagram 500 of the system 100 illustrating the status tracking of an exit node 130 (e.g., as well as the lifecycle of an exit node 130) in the storage module 170 during a graceful shutdown of the supernode 124, in one exemplary embodiment.

In this embodiment, exit node 130 may send a platform message 502 to supernode 124. Platform message 502 allows the supernode 124 to determine that the exit node 130 is operable and ready to communicate through the system 100. As mentioned above, exit node 130 may send platform message 502 to supernode 124 through gateway 106-2 (not shown in FIG. 4). Gateway 106-2 may direct the platform message to one of several possible supernodes 124 using a load-balancing algorithm.

In this regard, the supernode 124 may transmit a message to message queue 140 which in turn broadcasts throughout the system 100 that the exit node 130 is active. Initially, the status may be set to indicate that the exit node is newly connected. This information may be stored with the storage module 170 for use by any of the components within the system 100.

Once a connection is established between the supernode 124 and the exit node 130, the supernode 124 may send a ping message 506 to the exit node 130 to check if exit node 130 is still alive and how long it takes to respond with ping message 508. This may assist in determining a performance of the exit node 130. For example, if the exit node 130 requires an inordinate amount of time to respond, the supernode 124 (or other component in the system 100) may determine that the exit node 130 is underperforming so that it may be avoided in subsequent connection requests. The exit node 130 may respond with a corresponding ping message to supernode 124 which directs message queue 140 to broadcast the status of the exit node 130 as being active. At this point, a messenger 108 may select exit node 130 to service proxy requests.

According to an embodiment, supernode 124 may have a capability to shut down gracefully. For a graceful shutdown, supernode 124 first receive a shutdown signal 512 that indicates that supernode 124 start the shutdown process. In an example, shutdown signal 512 may be an operating system signal indicating that an application running supernode 124 should close.

On receipt of shutdown signal 512, supernode 124 may send an info message 514 that indicates to message queue 140, and in turn other components of proxy infrastructure 128, to stop sending proxy requests to supernode 124 (and accordingly those exit nodes that are connected to supernode 124). In response to message 514, messengers 108 will select different supernodes, other than the supernode that is shutting down, to service new proxy requests, or at least new proxy requests that are not associated with an already existing session ID.

In addition, in response to shutdown signal 512, supernode 124 starts a timer, such that after a certain period of time, supernode 124 closes all requests to the exit node 130. During this time, the supernode 124 may still send ping messages (such as ping message 516) to the exit node 130. And, the exit node 130 may still respond with return ping messages (such as ping message 518). After each successful ping, supernode 124 may send info message 520 indicating that the exit node 130 is still hot but maintaining inactive status for supernode 124 to avoid any new messages getting sent to it during the shutdown process. Exit node storage 170 and messenger 108 may have expect hot messages at a certain frequency for each exit node 130. If exit node storage 170 fails to receive a hot message within a certain period of time (TTL or time to live), it will designate the corresponding exit node 130 is being dead.

Once supernode 124 has received indication that all requests from all its exit node are closed or has determined that a timeout period is exceeded, a message 522 is sent through message queue 140 to exit node storage 170. Message 522 indicates that supernode 124 is no longer operational.

In this way, according to an embodiment, supernode 124 can shut down gracefully. When an administrator needs to shut down a supernode 124, pending requests to exit node 130 will be executed as opposed to being timed out and dropped. Also, messenger 108 will stop sending new proxy requests to supernodes 124 during the shutdown process, reducing the likelihood that those new requests will be dropped.

After supernode 124 is terminated, exit node 130 may be configured to connect to a new supernode. For example, as mentioned above, exit node 130 may send a platform message to a gateway 106-1, which will direct exit node 130 to a supernode that is operational.

Short and Long Living Connections

Figure 6:
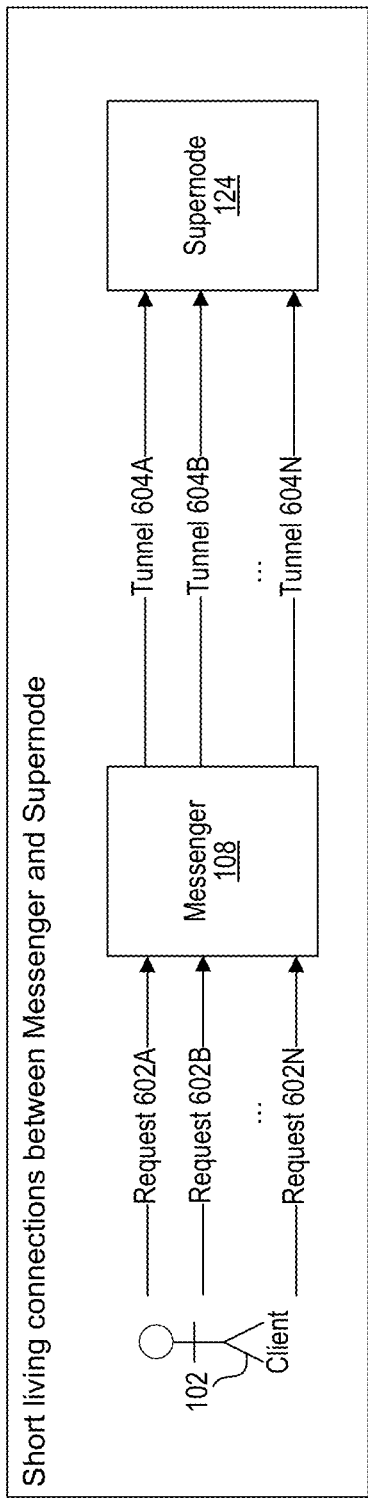
FIGS. 6 and 7 illustrate two possible ways for a messenger and supernode component to interact, one using a short living connection the other using a long living connection, according to embodiments.
Figure 7:
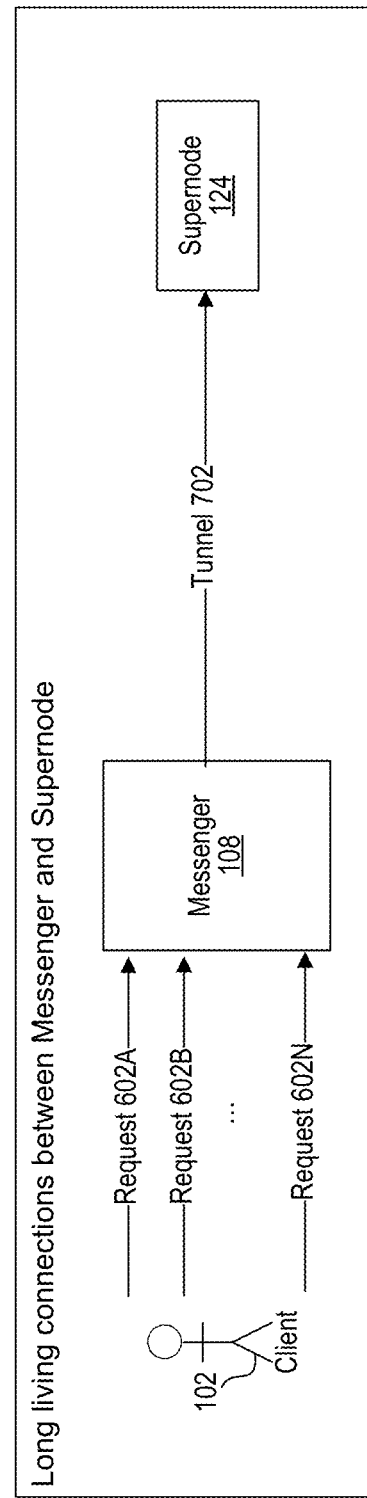

FIGS. 6 and 7 illustrate two possible ways for a messenger 108 and supernode 124 to interact, one using a short living connection the other using a long living connection, according to embodiments.

FIG. 6 illustrates short-term connections and FIG. 7 illustrates long-term connections. In both cases, the client issues a request to the messenger 108 to connect to a target 132. With the short-term connection, the messenger 108 may create a new networking tunnel 604A . . . N to the supernode 124 for each request 602A . . . N as it may be connected to an exit node 130 capable of connecting with the target 132. The messenger 108 may form this tunnel using any of a variety of protocols including HTTP, HTTPS, TCP, websocket, HTTP3, QUIC, and/or UDP.

In an example where TCP is used, each time a request is sent from client computing device 102, a new communication session is established between messenger 108 and supernode 124. To establish a TCP communication session, messenger 108 and supernode 124 may exchange SYN and ACK messages as described above with respect to FIG. 4A. When the request is complete, the TCP session between messenger 108 and supernode 124 may be terminated. To terminate the TCP session, FIN and ACK messages may be exchanged.

In some embodiments, the messenger 108 may establish a timer to determine when the connection to the supernode 124 should be broken. For example, the messenger 108 may receive a request from a client computing device 102 and connect to a target 132 through the supernode 124 (and the exit node 130 that it is connected to). After fulfilling the request, the messenger 108 may wait some predetermined period of time to see if another request comes in for the same target 132 (e.g., from the same or another client computing device 102). If no request is received, the messenger 108 may break the tunnel to the supernode 124 as it is no longer needed.

FIG. 7 illustrates the alternative embodiment where a longer connection is established between the messenger 108 and the target 132. For example, the client computing device 102 may issue a request to the messenger 108 to establish a connection with an exit node 130 using any of the aforementioned protocols. Then, once the connection is established through the supernode 124, the client computing device 102 can communicate to various targets 132 connected with the exit node 130 through the supernode 124. Even though the client computing device 102 may no longer desire traffic, the connection between the messenger 108 and the supernode 124 remains established such that other requests may be serviced (e.g., requests of the same or other clients 102). For example, the messenger 108 may maintain the connection to the supernode 124 because the messenger 108 may be receiving requests from multiple clients 102 for the same exit node 130 and/or the same target 132.

Health Data Storage

Figure 1B:
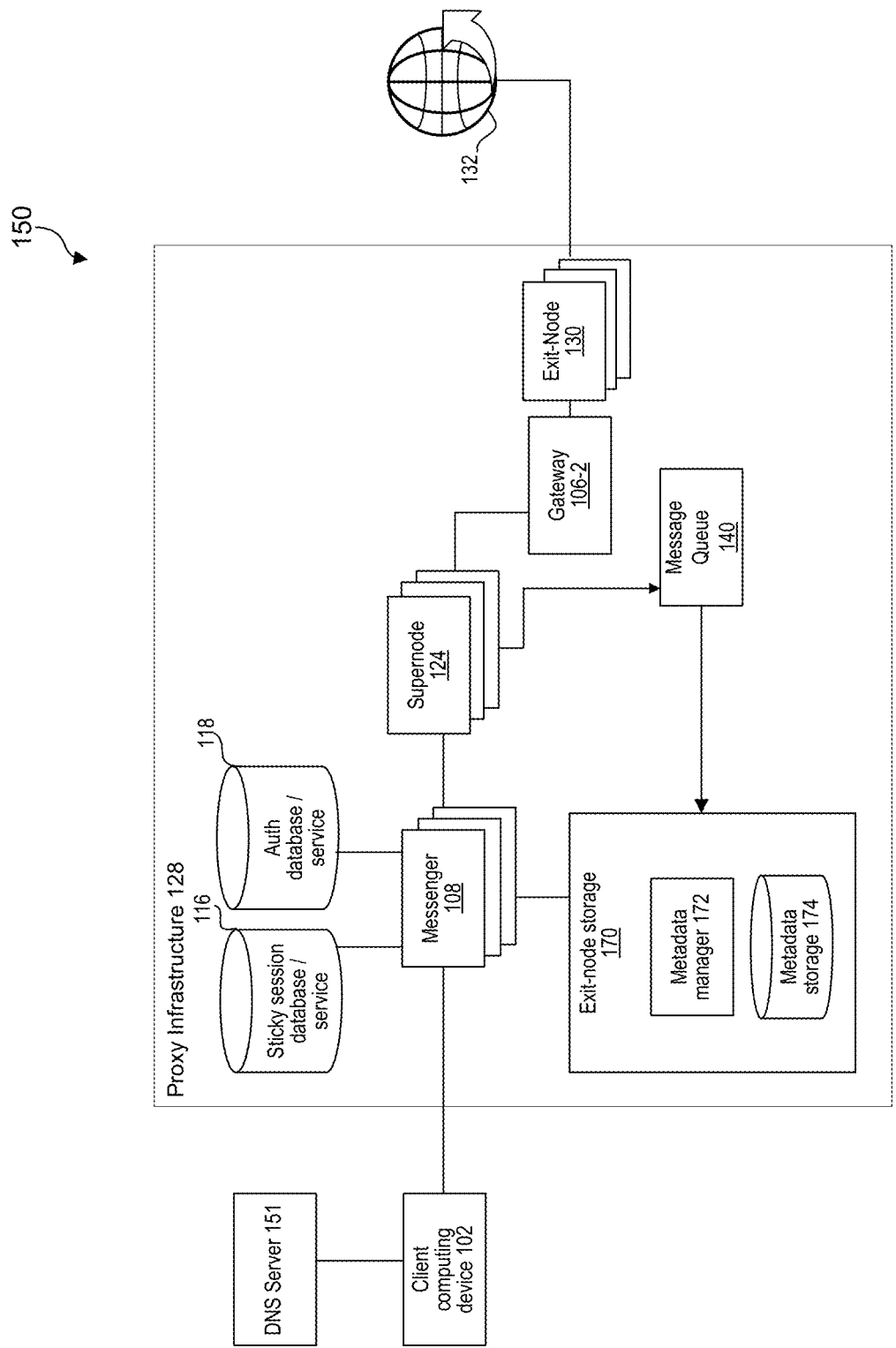
FIG. 1B is a system diagram that illustrates a proxy infrastructure with the client computing device having direct access to messenger units, according to an embodiment.

While FIGS. 1A-B and 2 separate exit node storage 170 and message queue 140, a person skilled in the art would recognize that these components may be omitted in different embodiments. In one example embodiment, the supernodes 122 and 124 may send metadata directly to exit node storage 170 avoiding the need for message queue 140. Message queue 140 may offer an advantage of providing an additional layer of abstraction so that exit node storage 170 can be taken off-line without risk of lost metadata. However, message queue 140 may introduce additional processing and delay as well. This is illustrated in FIG. 8.

Figure 8:
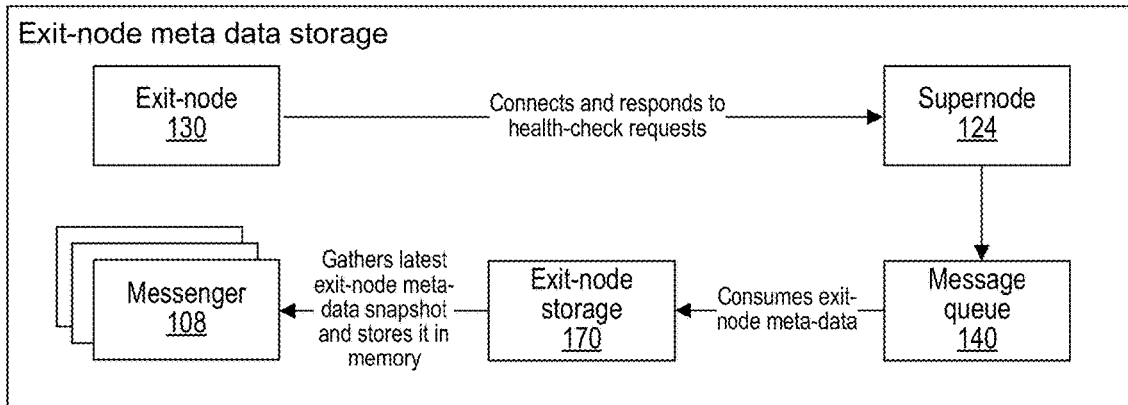
FIGS. 8-11 illustrate various methods of exit node metadata storage, according to embodiments.

FIG. 8 illustrates an exit node 130 reporting its health check information directly to a supernode 124 to which it is connected. The supernode 124 in turn reports this information to a message queue 140. The data storage module 170 may then retrieve that information from the message queue 140 such that any of the messengers 108 within the system 100 can gather the latest exit node metadata as needed and understand the exit node environment.

Figure 9:
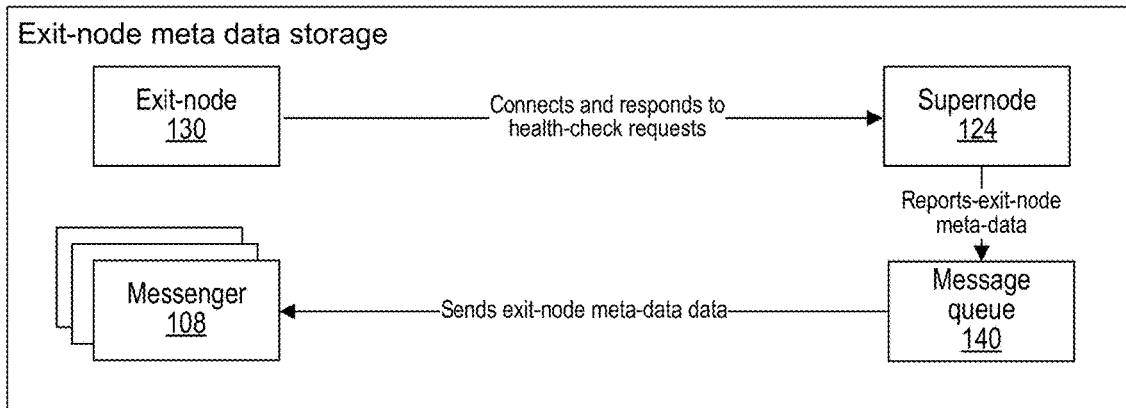

In another example embodiment, exit node storage 170 may be omitted and messenger 108 make and consume metadata directly from message queue 140. In this embodiment, messenger 108 could be managing exit nodes directly. This is illustrated in FIG. 9.

Figure 10:
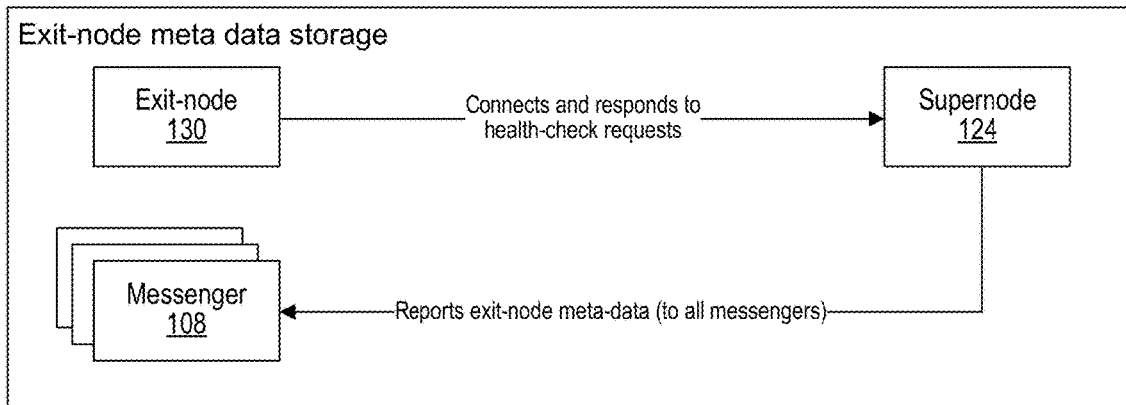

As illustrated in FIG. 10, supernode 124 can perform the health checks of the exit node 130 and report the exit node 130 metadata directly to multiple messengers 108 within the system 100. Each messenger 108 may store this information in a cache such that each messenger 108 understands the exit node 130 environment.

Figure 11:
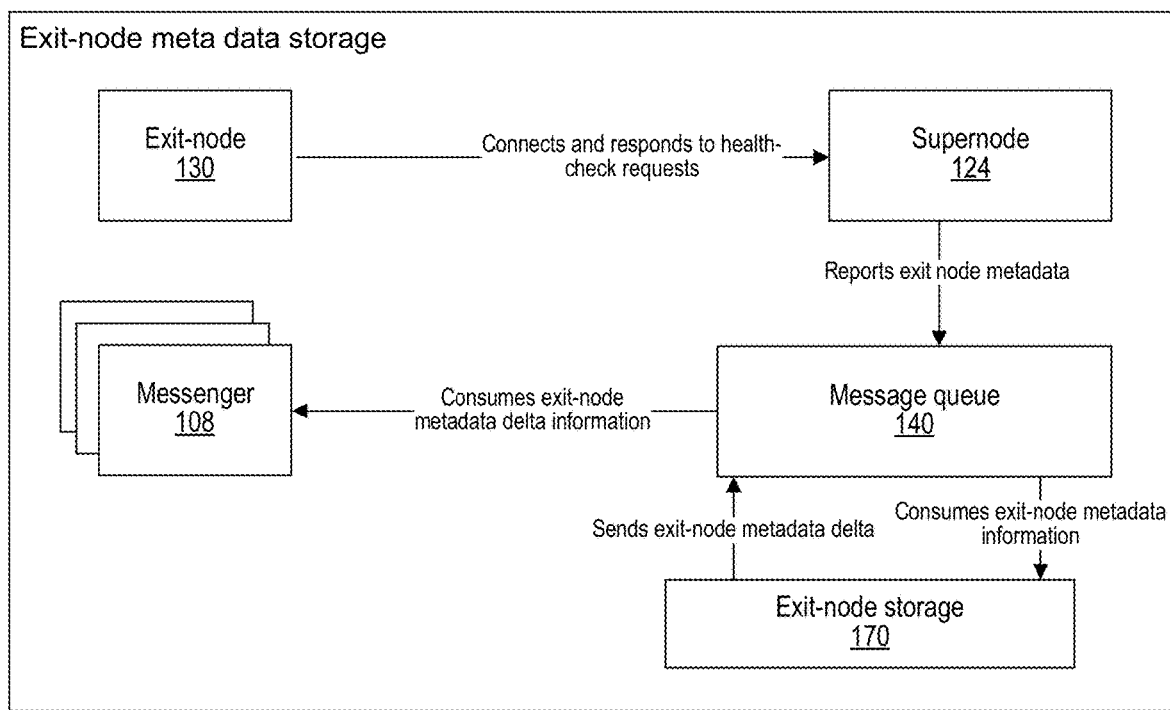

Finally, as illustrated in FIG. 11, supernode 124 can perform the health checks of exit node 130 and report the exit node 130 metadata to message queue 140. Exit node storage 170 consumes messages from message queue 140 indicating the exit node 130 metadata. Exit node storage 170 determines a delta representing changes in exit node metadata. Exit node storage 170 sends the delta back to message queue 140. Each messenger 108 may consume the delta information to update its own cache representing the exit node 130 environment.

CONCLUSION

Proxy servers (e.g., supernodes 122 and 124, exit nodes 130, etc.) can generally be categorized as residential Internet Protocol (IP) proxies, datacenter IP proxies, and mobile IP proxies depending on the functions they provide and/or the servers they employ. For example, a residential IP address is an IP address specifically designated by the owning party that is assigned to a private customer. And, a residential proxy is an IP address linked to a physical device, for example, a mobile phone or a desktop computer. The owner of the residential IP address (e.g., an internet service provider, or "ISP") registers the residential IP addresses in a public database, which allows websites to determine a device's internet provider, network, and/or location. A datacenter IP proxy is a proxy server assigned with a datacenter IP address. Datacenter IP addresses are typically owned by companies, unlike residential IP addresses, and are not typically located in a home. And, a mobile IP proxy may be considered a subset of the residential proxy in that it typically comprises one IP address that is obtained from mobile operators. A mobile IP proxy may use mobile data (e.g., cellular telephony data), as opposed to a residential proxy that uses broadband ISPs or home Wi-Fi.

Each of the modules, servers and other components described above may be implemented on software executed on one or more computing devices or different computing devices.

A computing device may include one or more processors (also called central processing units, or CPUs). The processor may be connected to a communication infrastructure or bus. The computer device may also include user input/output device(s), such as monitors, keyboards, pointing devices, etc., which may communicate with communication infrastructure through user input/output interface(s).

One or more of the processors may be a graphics processing units (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer device may also include a main or primary memory 408, such as random access memory (RAM). Main memory may include one or more levels of cache. Main memory may have stored therein control logic (i.e., computer software) and/or data.

The computer device may also include one or more secondary storage devices or memory. The secondary memory may include, for example, a hard disk drive, flash storage and/or a removable storage device or drive.

The computing device may further include a communication or network interface. The communication interface may allow a device to communicate and interact with any combination of external devices, external networks, external entities, etc. For example, the communication interface may allow the computer system to access external devices via a network, which may be wired and/or wireless (or a combination thereof), and which may include any combination of LANs, WANs, the Internet, etc The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer device may access or host any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computing devices may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards. Any of the databases or files described above may be stored in any format, structure, or schema in any type of memory and in a computing device.

In some embodiments, a tangible, non-transitory apparatus or article of manufacture comprising a tangible, non-transitory computer-usable or readable medium having control logic (software) stored thereon may also be referred to herein as a computer program product or program storage device. This includes, but is not limited to, main memory, secondary memory, and removable storage units, as well as tangible articles of manufacture embodying any combination of the foregoing. Such control logic may cause such data processing devices to operate as described herein.

A website is a collection of web pages containing related contents identified by a common domain name and published on at least one web server. A domain name is a series of alphanumeric strings separated by periods, serving as an address for a computer network connection and identifying the owner of the address. Domain names consist of two main elements—the website's name and the domain extension (e.g., .com). Typically, websites are dedicated to a particular type of content or service. A website can contain hyperlinks to several web pages, enabling a visitor to navigate between web pages. Web pages are documents containing specific collections of resources that are displayed in a web browser. A web page's fundamental element is one or more text files written in Hypertext Markup Language (HTML). Each web page in a website is identified by a distinct URL (Uniform Resource Locator). There are many varieties of websites, each providing a particular type of content or service.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

A proxy provider (e.g., the owner of a proxy server) can control the quality of proxy services and decide which IP addresses are going to be used for clients in a set of proxies. In some embodiments, if the same proxy server is used for too many requests, the proxy provider may ultimately ban requests from an ISP or to a particular webserver. Additionally, if too many requests come to a web server from one IP address, then the site may block the requests from that proxy for a predetermined period of time.

Blocking requests often occurs in "web scraping". Web scraping is generally the automated gathering of data from the internet. Web scraping is usually accomplished with a software program that queries a web server and requests data automatically. The web scraping software (a.k.a., web scrapers) then parses the retrieved data to extract the requested information.

Web scrapers advantageously collect and process large amounts of data. For example, rather than a client opening one page at a time through a web browser, a web scraper can view a large database comprising thousands or even millions of pages at once. Web scraping typically involves retrieving Hypertext Markup Language (HTML) data from a website, parsing the data for target information, and saving the target information. Web scrapers can also be used for streaming video. For example, a web scraper may retrieve content from one or more webservers to fill a playout buffer so that a client can begin playing from the buffer. Web crawling (via a software tool known as a "web crawler" or a "web spider"), on the other hand, simply retrieves raw HTML data from a website and indexes that data for subsequent expedited access.

Some web sites, however, prevent or reduce access by web scrapers and web crawlers as they can overwhelm the websites. For example, a web server may identify "bot-like" behavior and then identify the IP address of a web scraper. After identifying the IP address of the web scraper, the web server may block the web scraper from subsequent access.

Recognizing the bot-like behavior can be done in multiple ways. One approach involves observing a rate of actions over time, since humans normally perform less actions than a bot would. Sophisticated web scrapers, however, may choose to employ proxies which mask the real IP address of the web scraper. The web scrapers may thus operate through multiple IP addresses at the same time to increase performance and to avoid being blocked.

Proxy providers can be confronted with issues relating to web scraping and streaming activities. For web scraping, proxy providers try to provide a client with exit nodes 130 that have a lower probability of being blocked. For streaming, proxy providers try to ensure that exit nodes 130 are reliable and fast. If an exit node 130 disconnects during a session, a client typically has to reconnect to the streaming service.

It should also be noted that the various components of the system 100 in this exemplary embodiment may be more numerable than shown and spread out over many geographic locations across the globe. Moreover, the individual components of the system 100 may be implemented as individual servers, as multiple servers, and/or even as portions of a server's overall computing/networking capacity. Thus, for the purposes of simplicity and to aid the reader in understanding the embodiments herein, the system 100 is illustrated with one client device 102 communicating with one target 132.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements.

The disclosure presents a method for operating a proxy infrastructure, comprising:
  connecting to a plurality of third party proxy providers external to the proxy infrastructure;
  connecting to a plurality of exit nodes internal to the proxy infrastructure;
  receiving, at one of a plurality of messenger units of the proxy infrastructure, a proxy protocol request directly from a client computing device, the proxy protocol request specifying a target;
  in response to the proxy protocol request:
    selecting between one of the plurality of third party proxy providers and the plurality of exit nodes; and
    connecting with the target through the selected one of the plurality of third party proxy providers and the plurality of exit nodes.

The method is presented, further comprising:
  pinging each of the third party proxy providers to evaluate responses from each ping; and
  storing statistics of the third party proxy providers based on the evaluations,
  wherein the selecting occurs based on the stored statistics.

The method is presented, wherein the statistics are selected from at least one of: bandwidth of the third proxy provider; whether of the third proxy provider is active; or latency of the third proxy provider.

The method is presented, further comprising:
  pinging each of the exit nodes to evaluate responses from each ping; and
  storing statistics of the third party proxy providers based on the evaluations,
  wherein the selecting occurs based on the stored statistics.

The method is presented, wherein the proxy protocol request specifies a geographic location and wherein the selecting occurs based on the geographic location.

The method is presented, wherein a geographic location is selected according to which of the plurality of messenger units receives the proxy protocol request and wherein the selecting occurs based on the geographic location.

The method is presented, wherein the plurality of messenger units of the proxy infrastructure share a common domain name.

The method is presented, wherein the one of a plurality of messenger units is selected by a DNS server during a DNS lookup by the client computing device using a load balancing algorithm.

The disclosure presents a non-transitory computer-readable device having instructions stored thereon that, when executed by at least one computing device, cause the at least one computing device to perform operations, the operations comprising:

connecting to a plurality of third party proxy providers external to the proxy infrastructure;

connecting to a plurality of exit nodes internal to a proxy infrastructure;

receiving, at one of a plurality of messenger units of the proxy infrastructure, a proxy protocol request directly from a client computing device, the proxy protocol request specifying a target;

in response to the proxy protocol request:
selecting between one of the plurality of third party proxy providers and the plurality of exit nodes; and
connecting with the target through the selected one of the plurality of third party proxy providers and the plurality of exit nodes.

The computer-readable device is presented, the operations further comprising:

pinging each of the third party proxy providers to evaluate responses from each ping; and storing statistics of the third party proxy providers based on the evaluations, wherein the selecting occurs based on the stored statistics.

The computer-readable device is presented, wherein the statistics are selected from at least one of: bandwidth of the third proxy provider; whether of the third proxy provider is active; or latency of the third proxy provider.

The computer-readable device is presented, the operations further comprising:

pinging each of the exit nodes to evaluate responses from each ping; and storing statistics of the third party proxy providers based on the evaluations, wherein the selecting occurs based on the stored statistics.

The computer-readable device is presented, wherein the proxy protocol request specifies a geographic location and wherein the selecting occurs based on the geographic location.

The computer-readable device is presented, wherein a geographic location is selected according to which of the plurality of messenger units receives the proxy protocol request and wherein the selecting occurs based on the geographic location.

The computer-readable device is presented, wherein the plurality of messenger units of the proxy infrastructure share a common domain name.

The computer-readable device is presented, wherein the one of a plurality of messenger units is selected by a DNS server during a DNS lookup by the client computing device using a load balancing algorithm.

This disclosure presents a system for operating a proxy infrastructure, comprising:

an external supernode configured to handle a connection to a plurality of third party proxy providers external to the proxy infrastructure;

a supernode configured to handle a connection to a plurality of exit nodes internal to the proxy infrastructure;

a plurality of messenger units, each configured to receive a proxy protocol request directly from a client computing device, the proxy protocol request specifying a target;

a messenger unit configured to, in response to the proxy protocol request, retrieve a selection of one of the plurality of third party proxy providers and the plurality of exit nodes, wherein the selected one of the plurality of third party proxy providers and the plurality of exit nodes connects with the target.

The system is presented, wherein the external supernode is configured to ping each of the third party proxy providers to evaluate responses from each ping, and further comprising a database configured to store statistics of the third party proxy providers based on the evaluations. wherein the selecting occurs based on the stored statistics.

The system is presented, wherein the statistics are selected from at least one of: bandwidth of the third proxy provider; whether of the third proxy provider is active; or latency of the third proxy provider.

The system is presented, wherein the external supernode is configured to ping each of the exit nodes to evaluate responses from each ping, and further comprising a database configured to store statistics of the exit nodes based on the evaluations, wherein the selecting occurs based on the stored statistics.

This disclosure presents a method of operating a proxy infrastructure, comprising:

receiving, at one of a plurality of messenger units of the proxy infrastructure, a proxy protocol request directly from a client computing device, the proxy protocol request specifying a target;

in response to the proxy protocol request:
establishing a communication session with the target;
before the communication session to the target is established, providing a positive connection response to the client computing device; and
when the communication session is established, forwarding data requests from the client computing device to the target via the communication session.

The method is presented, further comprising:

before the communication session to the target is established, receiving the data requests from the client computing device; and until the communication session to the target is established, buffering the data requests.

The method is presented, wherein the positive connection response comprises a 200 OK response.

The method is presented, further comprising:

retrieving exit node data that directs an exit node to initiate the connection to the target simultaneously with the providing the positive connection response to the client.

The method is presented, further comprising:

communicating the request to the network element via a communication protocol that comprises at least one of: Transmission Control Protocol (TCP); User Datagram Protocol (UDP); HyperText Transfer Protocol (HTTP); HyperText Transfer Protocol Secure (HTTPS); Web Socket; Quic; or HyperText Transfer Protocol 3 (HTTP3).

The method is presented, further comprising:

bundling the data requests into a single data request, and to transfer the bundled data requests to the network element when the connection to the target is established.

The method is provided, wherein the plurality of messenger units of the proxy infrastructure share a common domain name.

The method is presented, wherein the one of a plurality of messenger units is selected by a DNS server during a DNS lookup by the client computing device using a load balancing algorithm.

This disclosure presents a non-transitory computer-readable device having instructions stored thereon that, when executed by at least one computing device, cause the at least one computing device to perform operations, the operations comprising:

receiving, at one of a plurality of messenger units of a proxy infrastructure, a proxy protocol request directly from a client computing device, the proxy protocol request specifying a target;

in response to the proxy protocol request:
establishing a communication session with the target;
before the communication session to the target is established, providing a positive connection response to the client computing device; and
when the communication session is established, forwarding data requests from the client computing device to the target via the communication session.

The computer-readable device is presented the operations comprising:

before the communication session to the target is established, receiving the data requests from the client computing device; and until the communication session to the target is established, buffering the data requests.

The computer-readable device is presented, wherein the positive connection response comprises a 200 OK response.

The computer-readable device is presented, the operations further comprising:

retrieving exit node data that directs an exit node to initiate the connection to the target simultaneously with the providing the positive connection response to the client.

The computer-readable device is presented, the operations further comprising:

communicating the request to the network element via a communication protocol that comprises at least one of: Transmission Control Protocol (TCP); User Datagram Protocol (UDP); HyperText Transfer Protocol (HTTP); HyperText Transfer Protocol Secure (HTTPS); Web Socket; Quic; or HyperText Transfer Protocol 3 (HTTP3).

The computer-readable device is presented, the operations further comprising:

bundling the data requests into a single data request, and to transfer the bundled data requests to the network element when the connection to the target is established.

The computer-readable device is presented, wherein the plurality of messenger units of the proxy infrastructure share a common domain name.

The computer-readable device is presented, wherein the one of a plurality of messenger units is selected by a DNS server during a DNS lookup by the client computing device using a load balancing algorithm.

This disclosure presents a system for operating a proxy infrastructure, comprising:

a plurality of messenger units of the proxy infrastructure configured to receive a proxy protocol request directly from a client computing device, the proxy protocol request specifying a target; and an exit node configured to, in response to the proxy protocol request, establish a communication session with the target and, when the communication session is established, forward data requests from the client computing device to the target via the communication session, wherein one of the plurality of messenger units, before the communication session to the target is established, provides a positive connection response to the client computing device.

The system is presented, wherein the one of the plurality of messenger units is configured to, before the communication session to the target is established, receive the data requests from the client computing device, and, until the communication session to the target is established, to buffer the data requests.

The system is presented, wherein the positive connection response comprises a 200 OK response.

The system is presented, wherein the one of a plurality of messenger units is selected by a DNS server during a DNS lookup by the client computing device using a load balancing algorithm.

This disclosure presents a method of operating a proxy infrastructure, comprising:

(a) establishing a connection to a plurality of exit nodes such that each of the plurality of exit nodes is connected to a supernode;

(b) receiving, at one of a plurality of messenger units of the proxy infrastructure, a proxy protocol request directly from a client computing device, the proxy protocol request specifying a request and a target;

in response to the proxy protocol request:
(c) selecting between one of the plurality of exit nodes;
(d) sending a message with the request from the messenger to the supernode connected to the selected exit node;
(e) sending the message from the supernode to the selected exit node to forward the request to the target.

The method is presented, wherein the proxy protocol request specifies previously established session to the target, and wherein the selecting comprises selecting an exit node from the plurality of exit nodes that was used to communicate with the target via the previously established session.

The method is presented, wherein the proxy protocol request specifies customer credentials, and further comprising verifying the customer credentials to determine whether the proxy protocol request is authorized.

The method is presented, wherein the supernode is one of a plurality of supernodes, and each of the supernodes is connected with a group of exit nodes from the plurality of exit nodes.

The method is presented, wherein each of the plurality of supernodes conducts health checks on the group of exit nodes that the respective supernode is connected to.

The method is presented, wherein each of the plurality of exit nodes connects to a gateway that directs the respective exit node to one of the plurality of supernodes.

The method is presented, wherein the gateway selects the one of the plurality of supernodes using a load balancing algorithm.

The method is presented, wherein the one of a plurality of messenger units is selected by a DNS server during a DNS lookup by the client computing device using a load balancing algorithm.

The method is presented, wherein sending (d) comprises establishing a communication tunnel over which to transmit the request, The method is presented, wherein sending (d) comprises sending the message to the supernode over an already established communication tunnel between the supernode and the messenger.

This disclosure presents a non-transitory computer-readable device having instructions stored thereon that, when executed by at least one computing device, cause the at least one computing device to perform operations, the operations comprising:

(a) establishing a connection with a plurality of exit nodes such that each of the plurality of exit nodes is connected with a supernode;

(b) receiving, at one of a plurality of messenger units of the proxy infrastructure, a proxy protocol request directly from a client computing device, the proxy protocol request specifying a request and a target;

in response to the proxy protocol request:

(c) selecting between one of the plurality of exit nodes;

(d) sending a message with the request from the messenger to the supernode connected with the selected exit node;

(e) sending the message from the supernode to the selected exit node to forward the request to the target.

The computer-readable device is presented, wherein the proxy protocol request specifies previously established session to the target, and wherein the selecting comprises selecting an exit node from the plurality of exit nodes that was used to communicate with the target via the previously established session.

The computer-readable device is presented, wherein the proxy protocol request specifies customer credentials, and further comprising verifying the customer credentials to determine whether the proxy protocol request is authorized.

The computer-readable device is presented, wherein the supernode is one of a plurality of supernodes, and each of the supernodes is connected with a group of exit nodes from the plurality of exit nodes.

The computer-readable device is presented, wherein each of the plurality of supernodes conducts health checks on the group of exit nodes the respective supernode is connected with.

The computer-readable device is presented, wherein each of the plurality of exit nodes connects to a gateway that directs the respective exit node to one of the plurality of supernodes.

The computer-readable device is presented, wherein the gateway selects the one of the plurality of supernodes using a load balancing algorithm.

The computer-readable device is presented, wherein the one of a plurality of messenger units is selected by a DNS server during a DNS lookup by the client computing device using a load balancing algorithm.

The computer-readable device is presented, wherein sending (d) comprises establishing a communication tunnel over which to transmit the request.

The computer-readable device is presented, wherein sending (d) comprises sending the message to the supernode over an already established communication tunnel between the supernode and the messenger.

This disclosure presents a method of operating a proxy infrastructure, comprising:

receiving a proxy protocol request directly from a client computing device;

establishing a connection to a target with an exit node of the proxy infrastructure;

at a supernode that manages communications to the exit node, receiving a shutdown signal requesting that the supernode terminate operation;

in response to the shutdown signal:

sending a message requesting that the supernode stop receiving new proxy requests;

initiating a timer; and if any data requests at the supernode remain open when the timer expires, closing remaining data requests to the target.

The method is presented, further comprising, with the supernode:

pinging the exit node to collect statistics on the exit node.

The method is presented, further comprising wherein the pinging occurs while the timer is running.

The method is presented, further comprising, while the timer is running, determining, based on the statistics, whether the exit node is still running.

The method is presented, further comprising, with the supernode:

marking the exit node as inactive upon receiving the shutdown signal.

The method is presented, further comprising, with a message queue:

broadcasting to components within the internet proxy system that the first network element is inactive.

The method is presented, wherein the receiving the proxy protocol request occurs at one of a plurality of messenger units is selected by a DNS server during a DNS lookup by the client computing device using a load balancing algorithm.

This disclosure provides a non-transitory computer-readable device having instructions stored thereon that, when executed by at least one computing device, cause the at least one computing device to perform operations, the operations comprising:

receiving a proxy protocol request directly from a client computing device;

establishing a connection to a target with an exit node of the proxy infrastructure;

at a supernode that manages communications to the exit node, receiving a shutdown signal requesting that the supernode terminate operation;

in response to the shutdown signal:

sending a message requesting that the supernode stop receiving new proxy requests;

initiating a timer; and if any data requests at the supernode remain open when the timer expires, closing remaining data requests to the target.

The computer-readable device is presented, the operations further comprising, with the supernode:

pinging the exit node to collect statistics on the exit node.

The computer-readable device is presented, wherein the pinging occurs while the timer is running.

The computer-readable device is presented, the operations further comprising, while the timer is running, determining, based on the statistics, whether the exit node is still running.

The computer-readable device is presented, the operations further comprising, with the supernode:

marking the exit node as inactive upon receiving the shutdown signal.

The computer-readable device is presented, the operations further comprising, with a message queue:

broadcasting to components within the proxy infrastructure that the first network element is inactive.

The computer-readable device is presented, wherein the one of a plurality of messenger units is selected by a DNS server during a DNS lookup by the client computing device using a load balancing algorithm.

A system for operating an internet proxy system, comprising:

a plurality of messenger units of the proxy infrastructure configured to receive a proxy protocol request directly from a client computing device; and a supernode configured to (i) establish a connection to a target with an exit node of the proxy infrastructure, (ii) manage communications to the exit node, (iii) receive a shutdown signal requesting that the supernode terminate operation, (iv) in response to the shutdown signal, send a message requesting that the supernode stop receiving new proxy requests initiating a timer, and (v) if any data requests at the supernode remain open when the timer expires, close remaining data requests to the target.

The system is presented, wherein the supernode is configured to ping the first network element to collect statistics on the exit node.

The system is presented, wherein the supernode is configured to ping the first network while the timer is running.

The system is presented, further comprising a messenger unit configured to, while the timer is running, determine, based on the statistics, whether the exit node is still running.

The system is presented, wherein the supernode is configured to mark the first network element as inactive upon receiving the shutdown signal.

The system is presented, wherein the one of a plurality of messenger units is selected by a DNS server during a DNS lookup by the client computing device using a load balancing algorithm.

This disclosure presents a method of operating a proxy infrastructure, comprising:

receiving, at one of a plurality of messenger units of the proxy infrastructure, a first proxy protocol request directly from a client computing device, the first proxy protocol request including a first request, a first session identifier and an identification of a target;

selecting an exit node from a plurality of exit nodes;

storing in a database an indication of the exit node associated with first session identifier;

transmitting the first request to the target via the selected exit node;

receiving, at one of a plurality of messenger units of the proxy infrastructure, a second proxy protocol request directly from the client computing device, the second proxy protocol request including a second request, a second session identifier and the identification of the target;

determining whether the first session identifier matches the second session identifier;

when the first session identifier matches the second session identifier:

retrieving the indication of the exit node from the database; and transmitting the second request to the target via the exit node such that the first and second requests appear to the target to have a common source.

The method is presented, wherein the first session identifier is embedded in first credentials of the first proxy protocol request and the second session identifier is embedded in second credentials of the second proxy protocol request.

The method is presented, wherein the first and second credentials are proxy authorization credentials.

The method is presented, wherein the proxy authorization credentials further include a username and password of the client.

The method is presented, wherein the proxy authorization credentials further include a desired geographic location of the exit node and wherein the selecting an exit node comprises selecting the exit node based on the desired geographic location.

The method is presented, wherein the selecting an exit node comprises selecting the exit node based on statistics collected on the plurality of exit nodes.

The method is presented, wherein the selecting an exit node comprises wherein the statistics indicate availability of respective exit nodes from the plurality of exit nodes.

The method is presented, wherein the first and second proxy protocol requests are part of a common TCP session between the client computing device and the target.

The method is presented, wherein the common TCP session is an HTTPS transaction.

The method is presented, wherein the one of a plurality of messenger units is selected by a DNS server during a DNS lookup by the client computing device using a load balancing algorithm.

This disclosure presents a non-transitory computer-readable device having instructions stored thereon that, when executed by at least one computing device, cause the at least one computing device to perform operations, the operations comprising:

receiving, at one of a plurality of messenger units of the proxy infrastructure, a first proxy protocol request directly from a client computing device, the first proxy protocol request including a first request, a first session identifier and an identification of a target;

selecting an exit node from a plurality of exit nodes;

storing in a database an indication of the exit node associated with first session identifier;

transmitting the first request to the target via the selected exit node;

receiving, at one of a plurality of messenger units of the proxy infrastructure, a second proxy protocol request directly from the client computing device, the second proxy protocol request including a second request, a second session identifier and the identification of the target;

determining whether the first session identifier matches the second session identifier;

when the first session identifier matches the second session identifier:

retrieving the indication of the exit node from the database; and transmitting the second request to the target via the exit node such that the first and second requests appear to the target to have a common source.

The computer-readable device is presented wherein the first session identifier is embedded in first credentials of the first proxy protocol request and the second session identifier is embedded in second credentials of the second proxy protocol request.

The computer-readable device is presented, wherein the first and second credentials are proxy authorization credentials.

The computer-readable device is presented, wherein the proxy authorization credentials further include a username and password of the client.

The computer-readable device is presented, wherein the proxy authorization credentials further include a desired geographic location of the exit node and wherein the selecting an exit node comprises selecting the exit node based on the desired geographic location.

The computer-readable device is presented, wherein the selecting an exit node comprises selecting the exit node based on statistics collected on the plurality of exit nodes.

The computer-readable device is presented, wherein the statistics indicate availability of respective exit nodes of the plurality of exit nodes.

The computer-readable device is presented, wherein the first and second proxy protocol requests are part of a common TCP session between the client computing device and the target.

The computer-readable device is presented, wherein the common TCP session is an HTTPS transaction.

The computer-readable device is presented, wherein the one of a plurality of messenger units is selected by a DNS server during a DNS lookup by the client computing device using a load balancing algorithm.

What is claimed is:

1. A method of operating a proxy infrastructure, comprising:
   (a) establishing a connection to a plurality of exit nodes such that each of the plurality of exit nodes is connected to a supernode;
   (b) receiving, at one of a plurality of messenger units of the proxy infrastructure, a proxy protocol request directly from a client computing device, the proxy protocol request specifying a request and a target;
   in response to the proxy protocol request:
   (c) selecting between one of the plurality of exit nodes;
   (d) sending a message with the proxy protocol request from the one of the plurality of messenger units to the supernode connected to the selected exit node;
   (e) sending the message from the supernode to the selected exit node to forward the request to the target.

2. The method of claim 1, wherein the proxy protocol request specifies a previously established session to the target, and wherein the selecting comprises selecting an exit node from the plurality of exit nodes that was used to communicate with the target via the previously established session.

3. The method of claim 1, wherein the proxy protocol request specifies customer credentials, and further comprising verifying the customer credentials to determine whether the proxy protocol request is authorized.

4. The method of claim 1, wherein the supernode is one of a plurality of supernodes, and each of the plurality of supernodes is connected with a group of exit nodes from the plurality of exit nodes.

5. The method of claim 4, wherein each of the plurality of supernodes conducts health checks on the group of exit nodes connected to the respective supernode.

6. The method of claim 4, wherein each of the plurality of exit nodes connects to a gateway that directs the respective exit node to the one of the plurality of supernodes.

7. The method of claim 6, wherein the gateway selects the one of the plurality of supernodes using a load balancing algorithm.

8. The method of claim 6, wherein the one of the plurality of messenger units is selected by a DNS server during a DNS lookup by the client computing device using a load balancing algorithm.

9. The method of claim 6, wherein the sending (d) comprises establishing a communication tunnel over which to transmit the request.

10. The method of claim 6, wherein the sending (d) comprises sending the message to the supernode over an already established communication tunnel between the supernode and the one of the plurality of messenger units.

11. A non-transitory computer-readable device having instructions stored thereon that, when executed by at least one computing device, cause the at least one computing device to perform operations, the operations comprising:
    (a) establishing a connection with a plurality of exit nodes such that each of the plurality of exit nodes is connected with a supernode;
    (b) receiving, at one of a plurality of messenger units of the proxy infrastructure, a proxy protocol request directly from a client computing device, the proxy protocol request specifying a request and a target;
    in response to the proxy protocol request:
    (c) selecting between one of the plurality of exit nodes;
    (d) sending a message with the proxy protocol request from the one of the plurality of messenger units to the supernode connected with the selected exit node;
    (e) sending the message from the supernode to the selected exit node to forward the request to the target.

12. The computer-readable device of claim 11, wherein the proxy protocol request specifies a previously established session to the target, and wherein the selecting comprises selecting an exit node from the plurality of exit nodes that was used to communicate with the target via the previously established session.

13. The computer-readable device of claim 11, wherein the proxy protocol request specifies customer credentials, and further comprising verifying the customer credentials to determine whether the proxy protocol request is authorized.

14. The computer-readable device of claim 11, wherein the supernode is one of a plurality of supernodes, and each of the plurality of supernodes is connected with a group of exit nodes from the plurality of exit nodes.

15. The computer-readable device of claim 14, wherein each of the plurality of supernodes conducts health checks on the group of exit nodes connected to the respective supernode.

16. The computer-readable device of claim 14, wherein each of the plurality of exit nodes connects to a gateway that directs the respective exit node to the one of the plurality of supernodes.

17. The computer-readable device of claim 16, wherein the gateway selects the one of the plurality of supernodes using a load balancing algorithm.

18. The computer-readable device of claim 16, wherein the one of the plurality of messenger units is selected by a DNS server during a DNS lookup by the client computing device using a load balancing algorithm.

19. The computer-readable device of claim 16, wherein the sending (d) comprises establishing a communication tunnel over which to transmit the request.

20. The computer-readable device of claim 16, wherein the sending (d) comprises sending the message to the supernode over an already established communication tunnel between the supernode and the one of the plurality of messenger units.

* * * * *